United States Patent

Hasebe et al.

[11] Patent Number: 5,886,440
[45] Date of Patent: Mar. 23, 1999

[54] ELECTRIC MOTOR WITH PLURAL ROTOR PORTIONS HAVING POLE MEMBERS OF DIFFERENT WIDTHS

[75] Inventors: Masahiro Hasebe; Yasuo Yamaguchi, both of Tokyo, Japan

[73] Assignee: Aisin Aw Co., Ltd., Aisin, Japan

[21] Appl. No.: 857,221

[22] Filed: May 16, 1997

Related U.S. Application Data

[63] Continuation of Ser. No. 431,757, May 1, 1995, abandoned.

[30] Foreign Application Priority Data

| May 2, 1994 | [JP] | Japan | 6-093601 |
| Apr. 10, 1995 | [JP] | Japan | 7-083974 |

[51] Int. Cl.⁶ .................................................. H02K 21/12
[52] U.S. Cl. ......................... 310/156; 310/261; 310/268
[58] Field of Search ................................. 310/49 R, 156, 310/261, 162, 268

[56] References Cited

U.S. PATENT DOCUMENTS

| 4,751,415 | 6/1988 | Kitamori et al. | 310/156 |
| 4,847,526 | 7/1989 | Takehera et al. | 310/185 |
| 5,038,065 | 8/1991 | Matsubayashi et al. | 310/162 |
| 5,095,238 | 3/1992 | Suzuki et al. | 310/156 |
| 5,386,161 | 1/1995 | Sakamoto | 310/49 R |
| 5,396,137 | 3/1995 | Shinto et al. | 310/156 |
| 5,510,662 | 4/1996 | Tanimoto et al. | 310/156 |

FOREIGN PATENT DOCUMENTS

| 648853 | 1/1989 | Japan | 310/156 |
| 1122352 | 5/1989 | Japan | 310/156 |
| 1122353 | 5/1989 | Japan | 310/156 |
| 1286758 | 11/1989 | Japan | 310/156 |
| 686524 | 3/1994 | Japan | 310/156 |

*Primary Examiner*—Nestor Ramirez
*Assistant Examiner*—Elvin G. Enad
*Attorney, Agent, or Firm*—Lorusso & Loud

[57] ABSTRACT

A motor capable of suppressing the torque ripple includes a rotor, a stator and stator coils. The rotor is provided with a plurality of permanent magnets which are arranged at a constant pitch in the circumferential direction. The stator surrounds the rotor and is formed with a plurality of stator poles and a slot located between every two stator poles. The stator coils are wound on the stator and are supplied with three-phase sinusoidal current. The rotor is composed of a plurality of rotor portions which are arranged in the axial direction of the rotor. The difference between the open angle of each permanent magnet of one rotor portion and the open angle of each permanent magnet of another rotor portion is an integral multiple of 30° in electrical angle. When three-phase sinusoidal current is applied to the stator coils, a torque ripple is generated. However, the phase of a torque ripple generated at one of the rotor portions arranged in the axial direction can be made different from the phase(s) of torque ripple(s) generated at other rotor portion(s).

16 Claims, 20 Drawing Sheets

ELECTRIC MOTOR WITH PLURAL ROTOR PORTIONS HAVING POLE MEMBERS OF DIFFERENT WIDTHS

This application is a continuation, of application Ser. No. 08/431,757, filed May 1, 1995, now abandoned.

BACKGROUND OF THE INVENTION

1. Field of the Invention

The present invention relates to a motor, and more particularly to a brushless motor.

2. Description of the Related Art

In a conventional brushless motor having a rotor made of a permanent magnet and a stator surrounding the rotor, a plurality of stator poles are formed in the yoke of the stator such that the stator poles face the periphery of the rotor. When current is supplied to stator coils wound on the yoke, repulsive forces and attractive forces are produced between the stator and the rotor due to magnetic flux induced by the current so that the rotor is rotated by the repulsive forces and attractive forces.

However, when three-phase sinusoidal current is applied to the stator coils of the conventional motor, a ripple is generated in the torque, which equals to the product of current and magnetic flux density, if the profile of magnetic flux generated at each magnetic pole of the rotor, i.e., the profile of the magnetic flux density is rectangular. The ripple is a sixth-order vibration having a frequency six times the frequency of the current.

SUMMARY OF THE INVENTION

An object of the present invention is to solve the above-described problems of conventional motors and to provide an improved motor in which the ripple of the torque (hereinafter referred to as "torque ripple") is suppressed.

A motor according to the present invention comprises a rotor provided with a plurality of permanent magnets which are arranged at a constant pitch in the circumferential direction, a stator which surrounds the rotor and is formed with a plurality of stator poles and a slot located between every two stator poles, and stator coils which are wound on the stator and are supplied with three-phase sinusoidal current. The rotor is composed of a plurality of rotor portions which are arranged in the axial direction of the rotor. The difference between the open angle of each permanent magnet of one rotor portion and the open angle of each permanent magnet of another rotor portion is an integral multiple of 30° in electrical angle.

The "open angle of each permanent magnet" corresponds to the length of each permanent magnet in the circumferential direction of the rotor.

When three-phase sinusoidal current is applied to the stator coils, a torque ripple is generated due to the interaction between the three-phase sinusoidal current and the profile of the magnetic flux density at each permanent magnet. In the motor of the present invention, the phase of a torque ripple generated at one of the rotor portions arranged in the axial direction can be made different from the phase(s) of torque ripple(s) generated at other rotor portion(s). Accordingly, the torque ripples are canceled out, so that the overall torque ripple of the motor can be suppressed.

Another motor according to the present invention also comprises a rotor provided with a plurality of permanent magnets which are arranged at a constant pitch in the circumferential direction, a stator which surrounds the rotor and formed with a plurality of stator poles and a slot located between every two stator poles, and stator coils which are wound on the stator and are supplied with three-phase sinusoidal current.

The rotor is composed of a plurality of rotor portions which are arranged in the circumferential direction of the rotor. The difference between the open angle of each permanent magnet of one rotor portion and the open angle of each permanent magnet of another rotor portion is an integral multiple of 30° in electrical angle.

When three-phase sinusoidal current is applied to the stator coils, a torque ripple is generated due to the interaction between the three-phase sinusoidal current and the profile of the magnetic flux density at each permanent magnet. However, the phase of a torque ripple generated at one of the rotor portions arranged in the circumferential direction can be made different from the phase(s) of torque ripple(s) generated at other rotor portion(s).

Accordingly, the torque ripples are canceled out, so that the overall torque ripple of the motor can be suppressed.

In still another motor according to the present invention, the difference between the open angle of each permanent magnet of one rotor portion and the open angle of each permanent magnet of another rotor portion is an odd multiple of mechanical pitch angle of the slots of the stator. In this case, when current for a light load is supplied to the stator coils, the phase of cogging vibration in torque generated at one rotor portion can be made different from the phase(s) of cogging vibration(s) generated at other rotor portion(s).

Accordingly, the cogging vibrations in torque can be canceled out, so that the overall cogging vibration of the motor can be suppressed.

In still another motor according to the present invention, a salient pole is formed between every two permanent magnets of each rotor portion, and the difference between the open angle of each salient pole of one rotor portion and the open angle of each salient pole of another rotor portion is an integral multiple of 30° in electrical angle. The "open angle of each salient pole" corresponds to the length of each salient pole in the circumferential direction of the rotor.

Since a salient pole exists between every two permanent magnets of each rotor portion, a torque ripple is generated due to the interaction between the three-phase sinusoidal current and the profile of magnetic flux density at each salient pole when the three-phase sinusoidal current is supplied to the stator coils. In this case, the difference between the open angle of each permanent magnet of one rotor portion and the open angle of each permanent magnet of another rotor portion and the difference between the open angle of each salient pole of one rotor portion and the open angle of each salient pole of another rotor portion are both an integral multiple of 30° in electrical angle. Hence, the phase of a torque ripple generated at one of the rotor portions arranged in the axial direction can be made different from the phase(s) of torque ripple(s) generated at other rotor portion(s).

Accordingly, the torque ripples are canceled out, so that the overall torque ripple of the motor can be suppressed.

Still another motor according to the present invention comprises a rotor provided with a plurality of salient poles which are arranged at a constant pitch in the circumferential direction, a stator which surrounds the rotor and is formed with a plurality of stator poles and a slot located between every two stator poles, and stator coils which are wound on the stator and are supplied with three-phase sinusoidal current.

The rotor is composed of a plurality of rotor portions which are arranged in the axial direction of the rotor. The difference between the open angle of each salient pole of one rotor portion and the open angle of each salient pole of another rotor portion is an integral multiple of 30° in electrical angle.

When three-phase sinusoidal current is applied to the stator coils, a torque ripple is generated due to the interaction between the three-phase sinusoidal current and the profile of the magnetic flux density at each salient pole. However, the phase of a torque ripple generated at one of the rotor portions arranged in the axial direction can be made different from the phase(s) of torque ripple(s) generated at other rotor portion(s).

Accordingly, the torque ripples are canceled out, so that the overall torque ripple of the motor can be suppressed.

Still another motor according to the present invention comprises a rotor provided with a plurality of salient poles which are arranged at a constant pitch in the circumferential direction, a stator which surrounds the rotor and formed with a plurality of stator poles and a slot located between every two stator poles, and stator coils which are wound on the stator and are supplied with three-phase sinusoidal current.

The rotor is composed of a plurality of rotor portions which are arranged in the circumferential direction of the rotor. The difference between the open angle of each salient pole of one rotor portion and the open angle of each salient pole of another rotor portion is an integral multiple of 30° in electrical angle.

When three-phase sinusoidal current is applied to the stator coils, a torque ripple is generated due to the interaction between the three-phase sinusoidal current and the profile of the magnetic flux density at each salient pole. However, the phase of a torque ripple generated at one of the rotor portions arranged in the circumferential direction can be made different from the phase(s) of torque ripple(s) generated at other rotor portion(s).

Accordingly, the torque ripples are canceled out, so that the overall torque ripple of the motor can be suppressed.

In still another motor according to the present invention, the difference between the open angle of each salient pole of one rotor portion and the open angle of each salient pole of another rotor portion is an odd multiple of mechanical pitch angle of the slots of the stator.

In this case, when current for a light load is supplied to the stator coils, the phase of cogging vibration in torque generated at one rotor portion can be made different from the phase(s) of cogging vibration(s) generated at other rotor portion(s).

Accordingly, the cogging vibrations in torque can be canceled out, so that the overall cogging vibration of the motor can be suppressed.

BRIEF DESCRIPTION OF THE DRAWINGS

The structure and features of the motor according to the present invention will be readily appreciated as the same becomes better understood by referring to the accompanying drawings, in which.

DESCRIPTION OF PREFERRED EMBODIMENTS

Embodiments of the present invention will now be described in detail with reference to the accompanying drawings.

Figure 1:
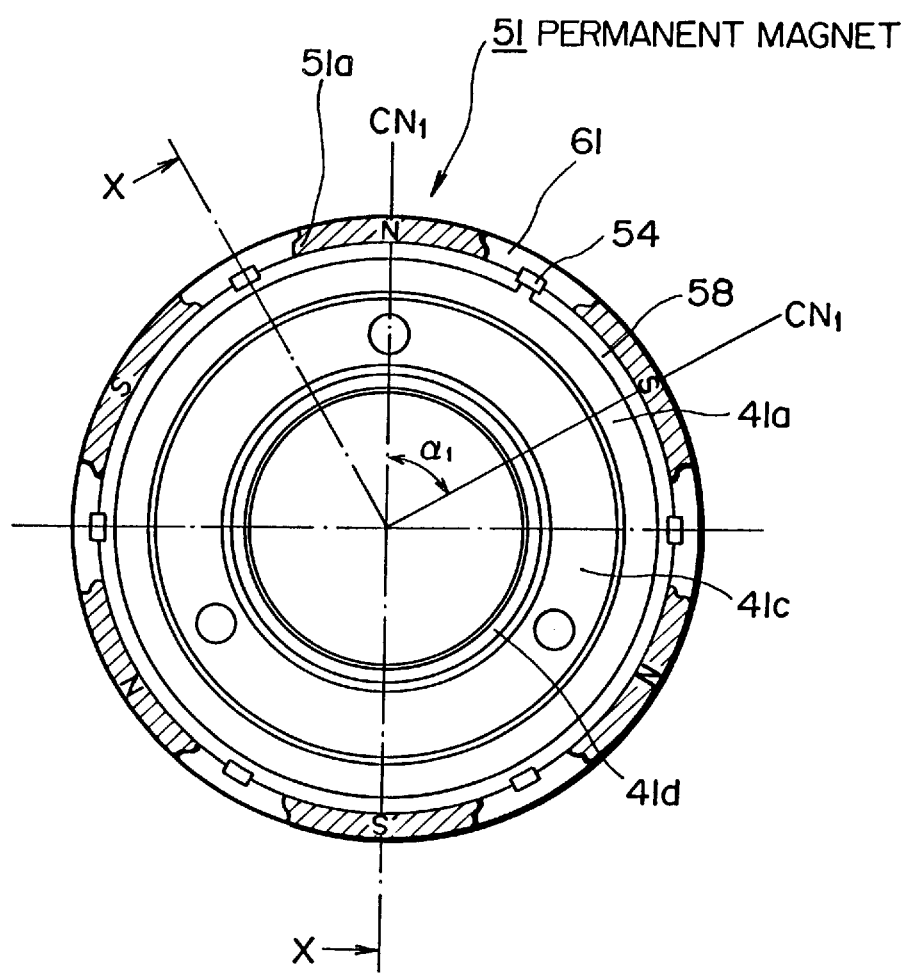
FIG. 1 is a right side view of a rotor according to a first embodiment of the present invention.
Figure 2:
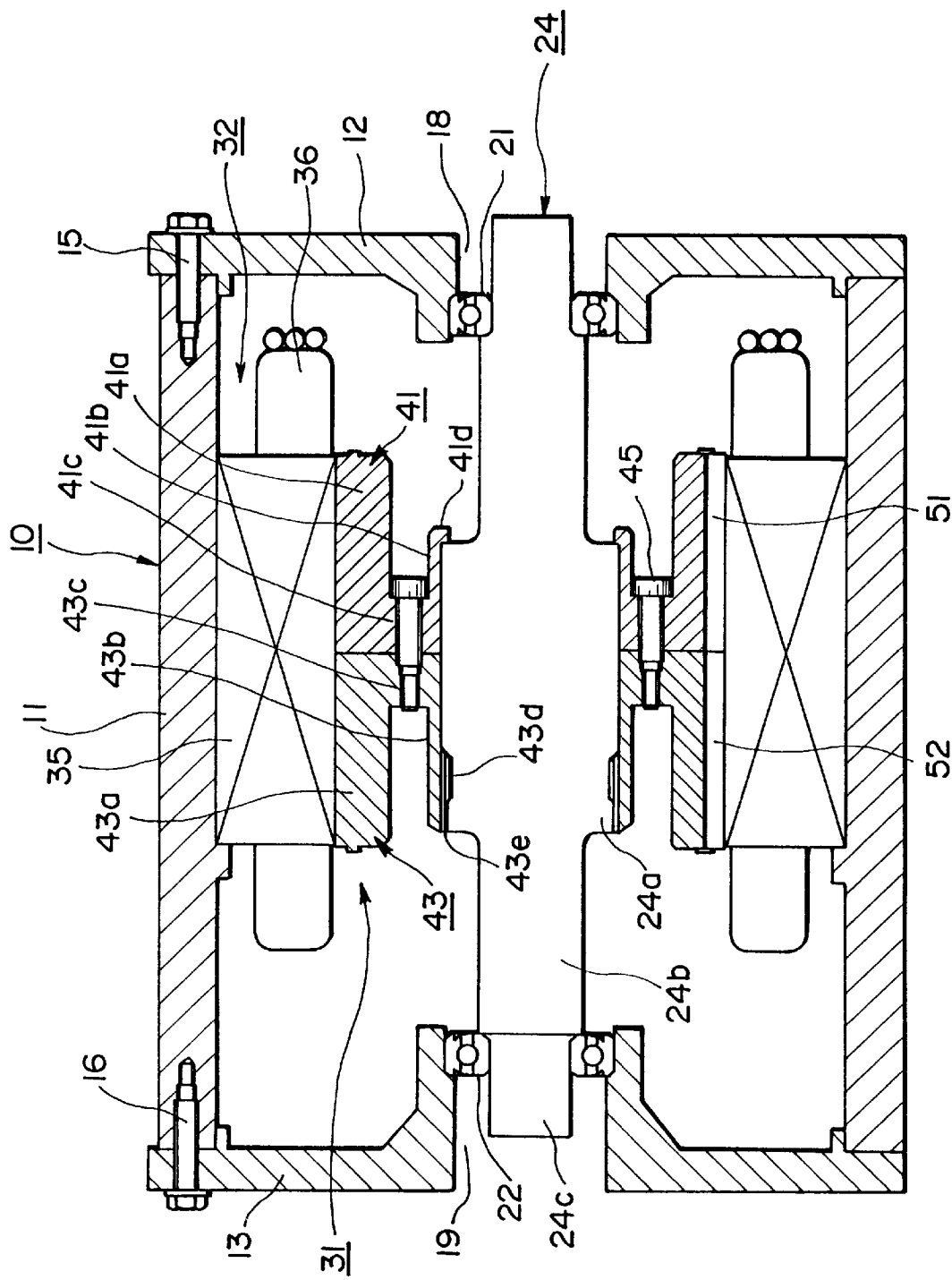
FIG. 2 is a sectional view of a motor according to the first embodiment of the present invention.
Figure 3:
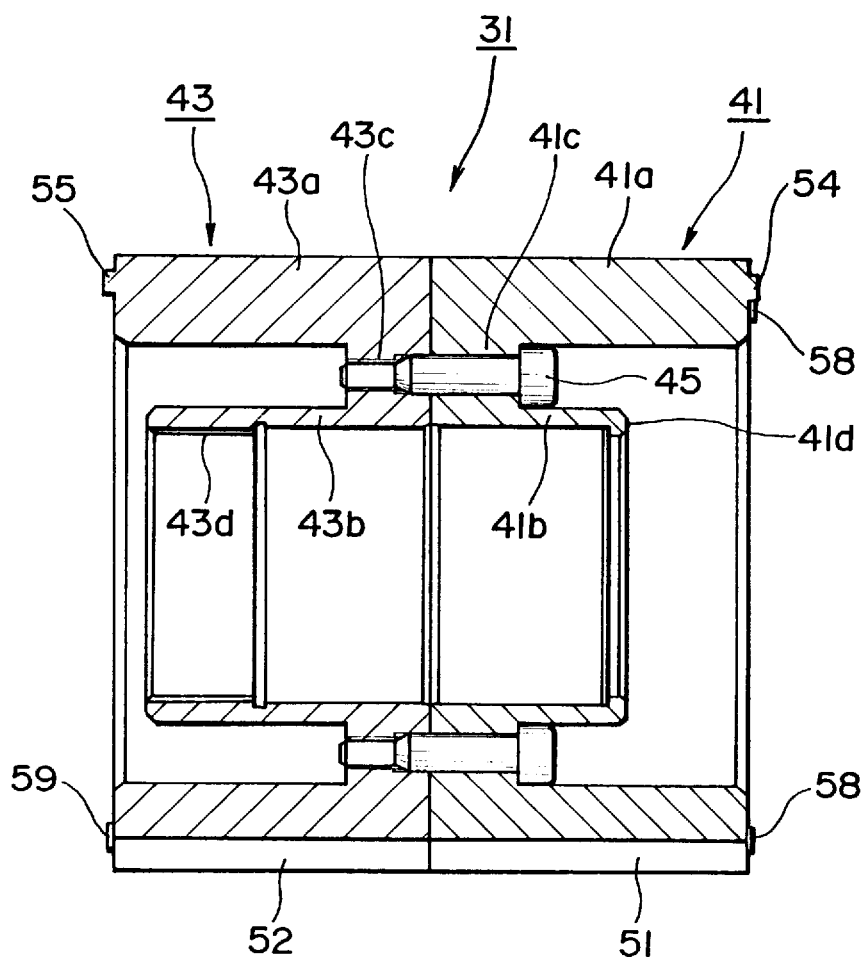
FIG. 3 is a sectional view of the rotor shown in FIG. 1.
Figure 4:
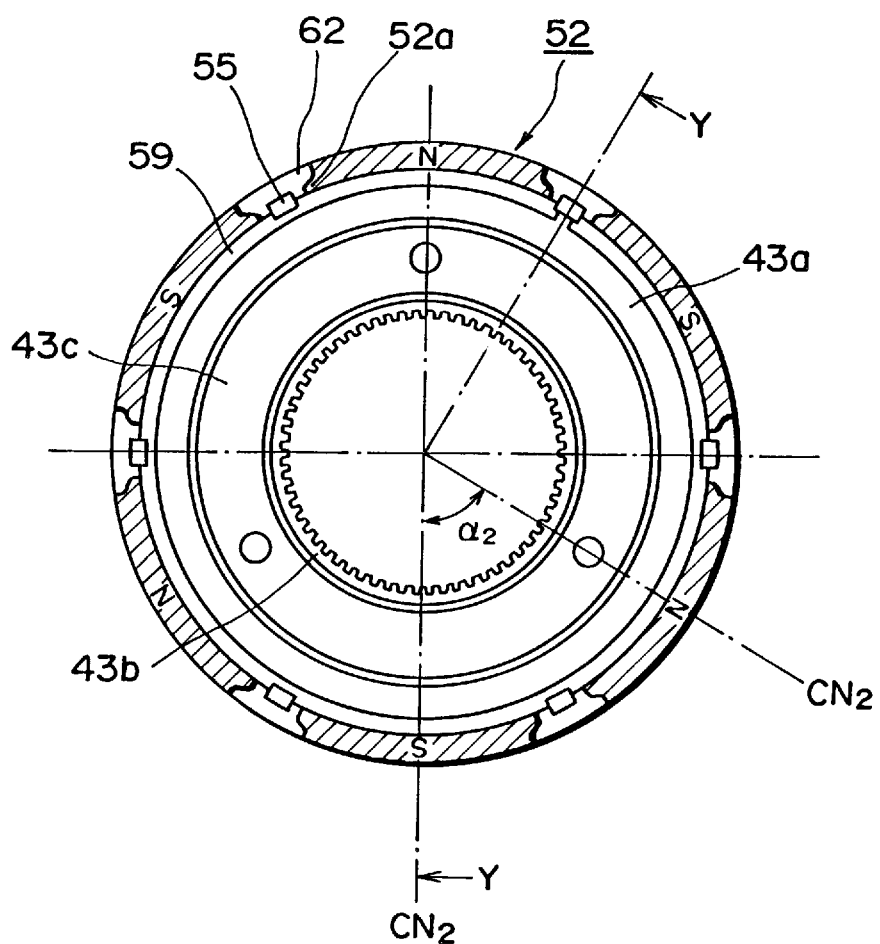
FIG. 4 is a left side view of the rotor shown in FIG. 3.

FIG. 1 is a right side view of a rotor according to a first embodiment of the present invention, FIG. 2 is a sectional view of a motor according to the first embodiment of the present invention, FIG. 3 is a sectional view of the rotor shown in FIG. 1, and FIG. 4 is a left side view of the rotor shown in FIG. 3. FIG. 3 is a sectional view taken along line X—X in FIG. 1 and a sectional view taken along line Y—Y in FIG. 4.

As shown in these drawings, a motor casing 10 is formed by a cylindrical casing 11, and circular plates 12 and 13 fixed to both ends of the casing 11. The circular plates 12 and 13 are fixed to the casing 11 with bolts 15 and 16 which are provided at a plurality of locations along the circumferential edges of the circular plates 12 and 13. Openings 18 and 19 are formed at the centers of the circular plates 12 and 13. A rotor shaft 24 is rotatably supported by bearings 21 and 22 which are built in the openings 18 and 19.

The rotor shaft 24 has a large diameter portion 24a formed at the central portion, a pair of intermediate diameter portions 24b integratedly formed on both sides of the larger diameter portion 24a, and a pair of small diameter portions 24c integratedly formed on both sides of the intermediate diameter portions 24b. The small diameter portions 24c are inserted into the inner races of the bearings 21 and 22.

A rotor 31 is fixed to the large diameter portion 24a of the rotor shaft 24. A stator 32 is fixed to the casing 11 so that the stator 32 surrounds the rotor 31. The stator 32 is formed by a cylindrical yoke 35 and stator coils 36 wound on the yoke 35, The yoke 35 has a cylindrical stator yoke portion and a plurality of stator poles which project radially inward from the stator yoke portion. In the present embodiment, 36 stator poles are formed.

The rotor 31 is divided into two pieces in the axial direction, i.e., along a plane perpendicular to the rotor shaft 24. That is, the rotor 31 is formed by a first rotor portion 41 and a second rotor portion 43 arranged in the axial direction. The first rotor 41 has a first yoke 41a, a boss 41b, and an annular portion 41c. The first yoke 41a extends in the axial direction and is adapted to support permanent magnets 51. The boss 41b extending in the axial direction is formed inside the first yoke 41a and is fixed to the large diameter portion 24a of the rotor shaft 24. The annular portion 41c integrally connects the first yoke 41a and the boss 41c at their inner ends facing the second rotor 43. The second rotor 43 has a second yoke 43a, a boss portion 43b, and an annular portion 43c. The second yoke 43a extends in the axial direction and is adapted to support permanent magnets 52. The boss 43b extending in the axial direction is formed inside the second yoke 43a and is fixed to the large diameter portion 24a of the rotor shaft 24. The annular portion 43c integrally connects the second yoke 43a and the boss 43b at their inner ends facing the first rotor 41.

The first rotor portion 41 and the second rotor portion 43 are assembled such that they contact each other at the back surfaces of the annular portions 41c and 43c, and are fixed to each other with bolts 45 at a plurality of positions in the circumferential direction.

To prevent axial movement of the rotor 31 relative to the rotor shaft 24, an engagement portion 41d is formed at one end of the boss 41b such that the engagement portion 41d extends radially inward. The engagement portion 41d is engaged with a stepped portion formed between the large diameter portion 24a and one of the intermediate diameter portion 24b to prevent the first rotor portion 41 from moving to the side where the second rotor portion 43 is situated. A spline 43d is formed on the inner surface of the boss 43b. The spline 43d is engaged with a spline 43e which is formed on the outer surface of the large diameter portion 24a at its one end. The engagement between the splines 43d and 43e prevents the second rotor portion 43 from rotating relative to the rotor shaft 24, and from moving to the side where the first rotor portion 41 is situated.

In the present embodiment, the rotor 31 has an inverted salient pole structure which is used in a permanent magnet type synchronous motor. The permanent magnets 51 and 52 are embedded in the first and second yokes 41a and 43a at six different positions in the circumferential direction, such that the permanent magnets 51 and 52 form a cylindrical surface in cooperation with the first and second yokes 41a and 43a. In the present embodiment, each pitch angle $\alpha_1$ of the permanent magnets 51 and each pitch angle $\alpha_2$ of the permanent magnets 52 are both 60°. Also, the permanent magnets 51 and 52 are arranged such that the center $CN_1$ of each permanent magnet 51 coincides with the center $CN_2$ of each permanent magnet 52. The permanent magnets 51 and 52 are provided with projections 51a and 52a formed at both lateral edges thereof. Since the projections 51a and 52a engage with the yoke projections 61 and 62 of the first and second yokes 41a and 43a, the permanent magnets 51 and 52 are prevented from flying off due to centrifugal force.

Engagement projections 54 are formed at the outer circumferential edge of the end surface of the first yoke 41a such that the engagement projections 54 are located at the end surfaces of the yoke projections 61. A snap ring 58 is held by the engagement projections 54. Since the outer circumferential edge of the snap ring 58 is located radially outside the inner circumferential edges of the permanent magnets 51, axial movement of the permanent magnets 51 can be prevented by engaging the snap ring 58 with the engagement projections 54. Similarly, engagement projections 55 are formed at the outer circumferential edge of the end surface of the second yoke 43a such that the engagement projections 55 are located at the end surfaces of the yoke projections 62. A snap ring 59 is held by the engagement projections 55. The outer circumferential edge of the snap ring 59 is located radially outside the inner circumferential edges of the permanent magnets 52, axial movement of the permanent magnets 52 can be prevented by engaging the snap ring 59 with the engagement projections 55.

Next, the relationship between the magnetic poles of the permanent magnets 51 of the first rotor portion 41 and the magnetic poles of the permanent magnets 52 of the second rotor portion 43 will be described.

Figure 5:
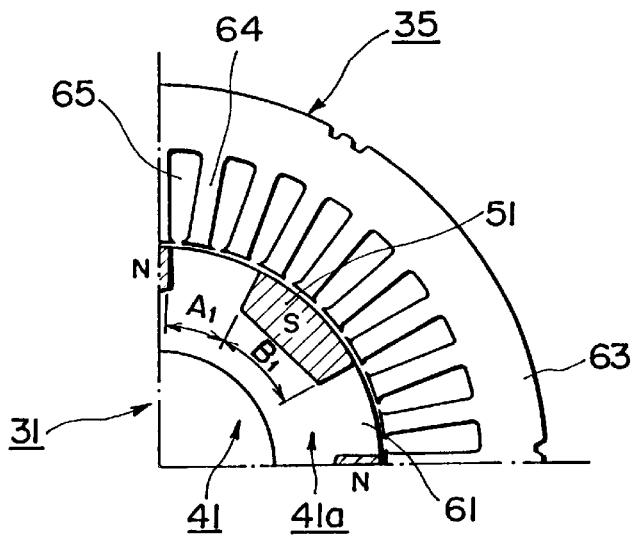
FIG. 5 through FIG. 7 are explanatory charts showing first, second and third states of the first rotor portion of the rotor according to the first embodiment.
Figure 6:
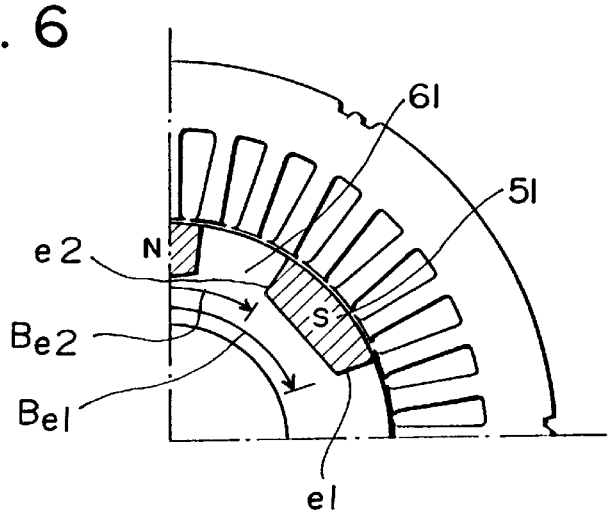
Figure 7:
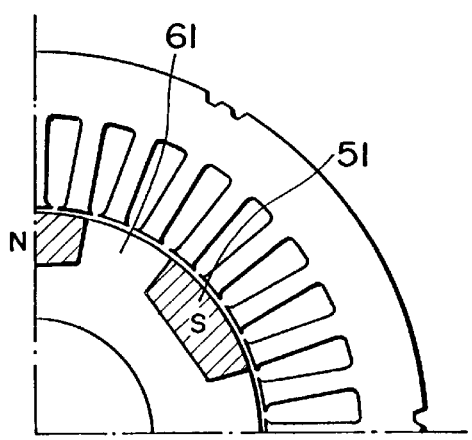
Figure 8:
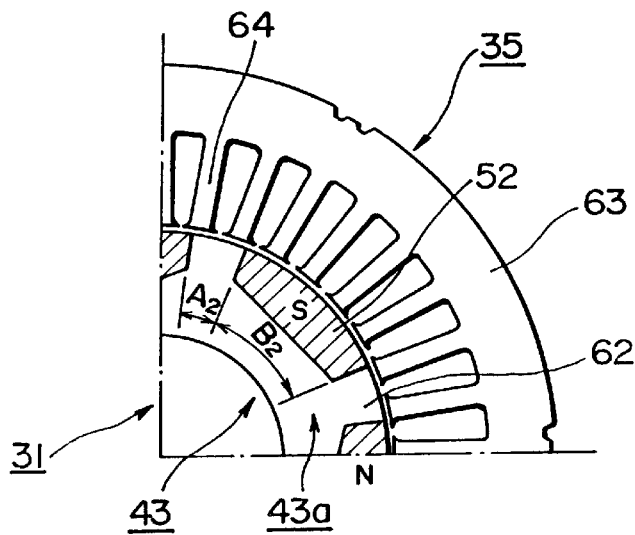
FIG. 8 through FIG. 10 are explanatory charts showing first, second and third states of the second rotor portion of the rotor according to the first embodiment.
Figure 9:
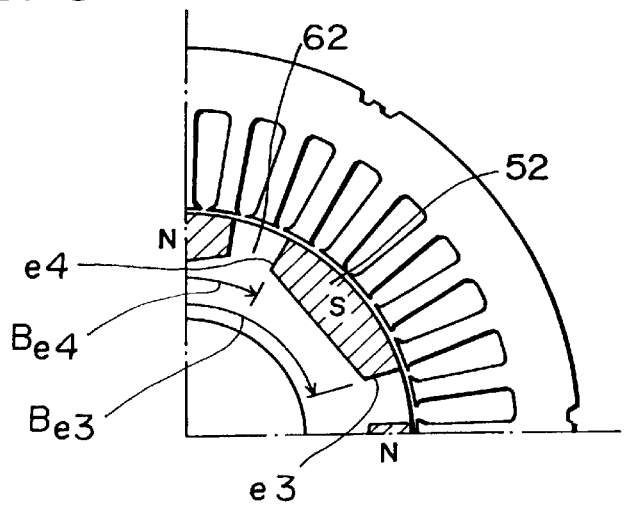
Figure 10:
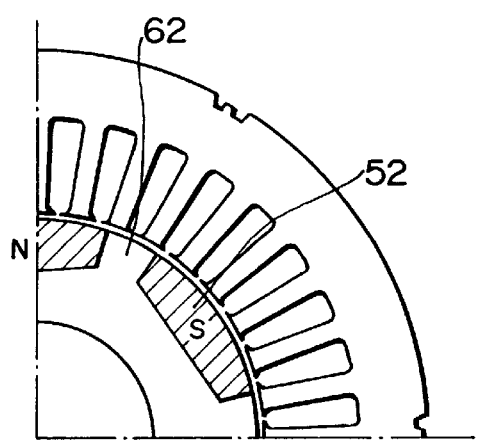

FIG. 5 through FIG. 7 are explanatory charts showing first, second and third states of the first rotor portion of the rotor according to the first embodiment, and FIG. 8 through FIG. 10 are explanatory charts showing first, second and third states of the second rotor portion of the rotor according to the first embodiment. FIG. 5 and FIG. 8 show states where the rotational angle of the rotor 31 is 0°. FIG. 6 and FIG. 9 show states where the rotational angle of the rotor 31 is 5°. FIG. 7 and FIG. 10 show states where the rotational angle of the rotor 31 is 10°.

Here, a six-pole motor which has three pairs of poles will be described. That is, six permanent magnets 51 are embedded in the periphery of the first yoke 41a while six permanent magnets 52 are embedded in the periphery of the second yoke 43a. In this example, each pitch angle $\alpha_1$ of the permanent magnets 51 and each pitch angle $\alpha_2$ of the permanent magnets 52 are both 60°. Also, the permanent magnets 51 and 52 are arranged such that the center $CN_1$ of each permanent magnet 51 coincides with the center $CN_2$ of each permanent magnet 52.

As shown in the drawings, the yoke 35 has a cylindrical stator yoke portion 63 and a plurality of stator poles 64 which project radially inward from the stator yoke portion 64. A slot 65 is formed between every two adjacent stator poles 64.

The permanent magnets 51 are embedded in the periphery of the first yoke 41a of the rotor 31 so that a yoke projection 61 is formed between every two permanent magnets 51. Similarly, the permanent magnets 52 are embedded in the periphery of the second yoke 43a of the rotor 31 so that a yoke projection 62 is formed between every two permanent magnets 52. The rotor 31 is rotated in the clockwise direction in the drawings so that rotational torque is generated in the clockwise direction.

It is assumed that the open angle (circumferential width) of each yoke projection 61 (hereinafter referred to as "yoke projection open angle") of the first rotor portion 41 and the yoke projection open angle of the second rotor portion 43 are $A_1$ and $A_2$, respectively, in mechanical angle, and that the open angle (circumferential width) of each permanent magnet 51 (hereinafter referred to as "magnetic pole open angle") of the first rotor portion 41 and the magnetic pole open angle of the second rotor portion 43 are $B_1$ and $B_2$, respectively, in mechanical angle. In this case, the absolute value $d_M$ of the difference between the mechanical angles is represented as follows:

$$d_M = |A_1 - A_2| = |B_1 - B_2|.$$

When the number of pairs of magnetic poles of the motor is m, the absolute value $d_E$ of the difference between the electrical angles is represented as follows:

$$d_E = m \cdot |A_1 - A_2|.$$

The absolute value $d_E$ of the difference between the electrical angles corresponds to the absolute value of the difference between the width of the profile of the magnetic flux density at the first rotor portion 41 and the width of the profile of the magnetic flux density at the second rotor portion 43.

In the present embodiment, the absolute value $d_E$ of the difference between the electrical angles is set to an integral multiple of 30°. With this setting, a phase difference of 180° is produced between a torque ripple generated at the first rotor portion 41 and a torque ripple generated at the second rotor portion 43 when three-phase sinusoidal current is supplied to the stator coils 36 (see FIG. 2). Accordingly, the torque ripples are canceled out so that the overall torque ripple of the motor can be suppressed.

In the present embodiment, the yoke projection open angle $A_1$ of the first rotor portion 41 is set to 25° while the magnetic pole open angle $B_1$ of the first rotor portion 41 is set to 35°. Also, the yoke projection open angle $A_2$ of the second rotor portion 43 is set to 15° while the magnetic pole open angle $B_2$ of the second rotor portion 43 is set to 45°.

In this case, the absolute value $d_M$ of the difference between the mechanical angles is represented as follows:

$$d_M = 10.$$

Since the number of pairs of magnetic poles is 3, the absolute value $d_E$ of the difference between the electrical angles is represented as follows:

$$\begin{aligned} d_E &= 3 \times 10 \\ &= 30. \end{aligned}$$

Consequently, the absolute value $d_E$ of the difference between the electrical angles becomes 30°×1.

Expressed differently, each magnet 51 of the rotor 41 has a leading edge e1 and a trailing edge e2 in the clockwise circumferential direction and each magnet 52 of the rotor 43 has a leading edge e3 and a trailing edge e4 in the clockwise circumferential direction. The angle $B_{e1}$ that the edge e1 of the magnet 51 makes relative to a zero electrical stator angle differs in electrical angle from the angle $B_{e3}$ that the edge e3 of the corresponding magnet 52 of the same polarity makes relative to the zero stator angle by $$+15° \times n + 360° \times k$$

and the angle $B_{e2}$ that the edge e2 of the magnet 51 makes relative to the zero stator angle differs in electrical angle from the angle $B_{e4}$ that the edge e4 of corresponding magnet 52 of the same polarity makes relative to the zero stator angle by $$-15° \times n + 360° \times k$$

wherein n and k are integral numbers. In the present embodiment n=1 so that when k=0 (magnet 51 is centered at the same electrical angle as magnet 52 relative to the zero stator angle) the difference in electrical angle between e1 and e3 ($B_{e3} - B_{e1}$) is +15° and the difference in electrical angle between e2 and e4 ($B_{e4} - B_{e2}$) is −15°.

Next, a state in which torque ripples are canceled will be described.

Figure 11:
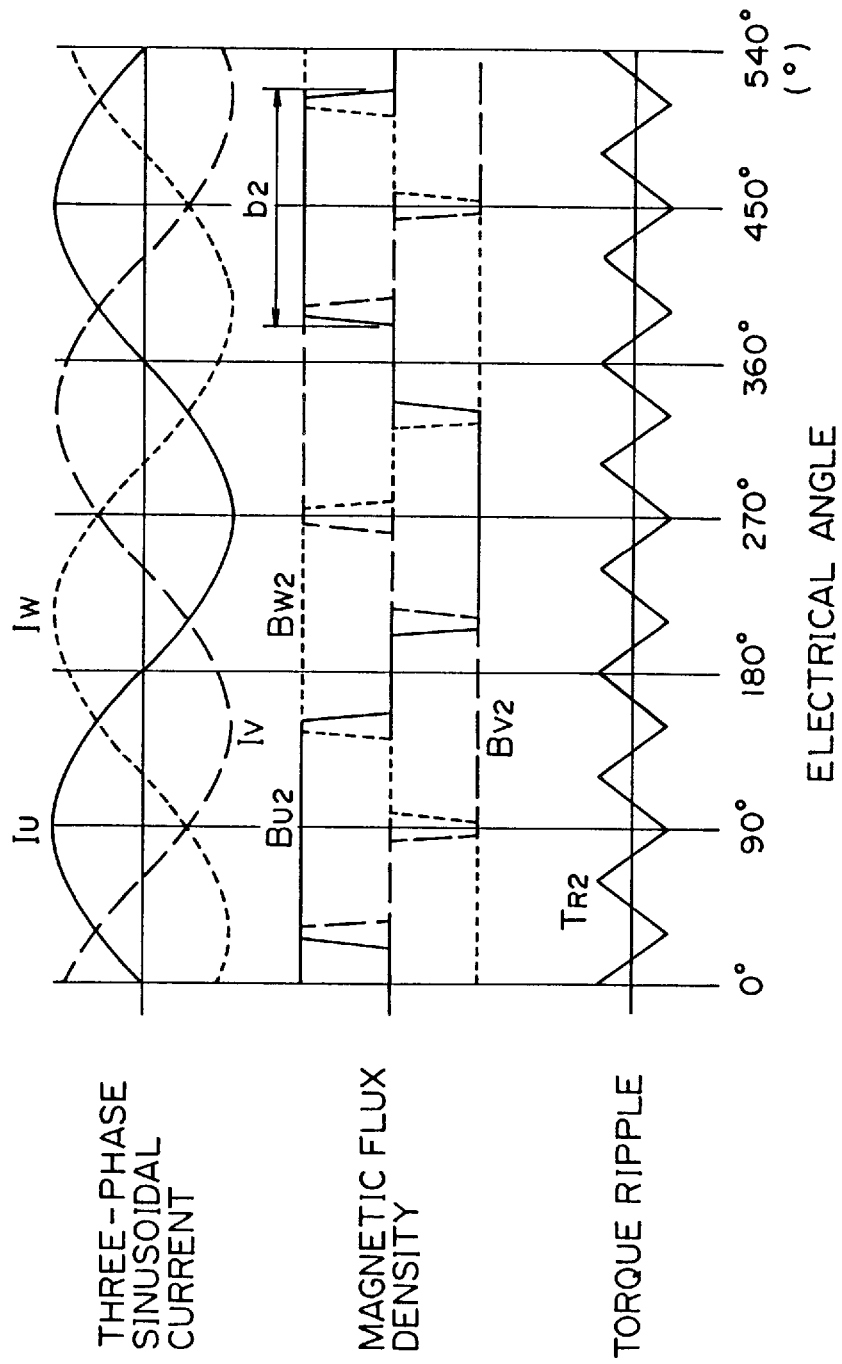
FIG. 11 is a time chart showing the waveform of three-phase sinusoidal current supplied to the second rotor portion, and the profile of the magnetic flux density and a torque ripple in the second rotor portion.
Figure 12:
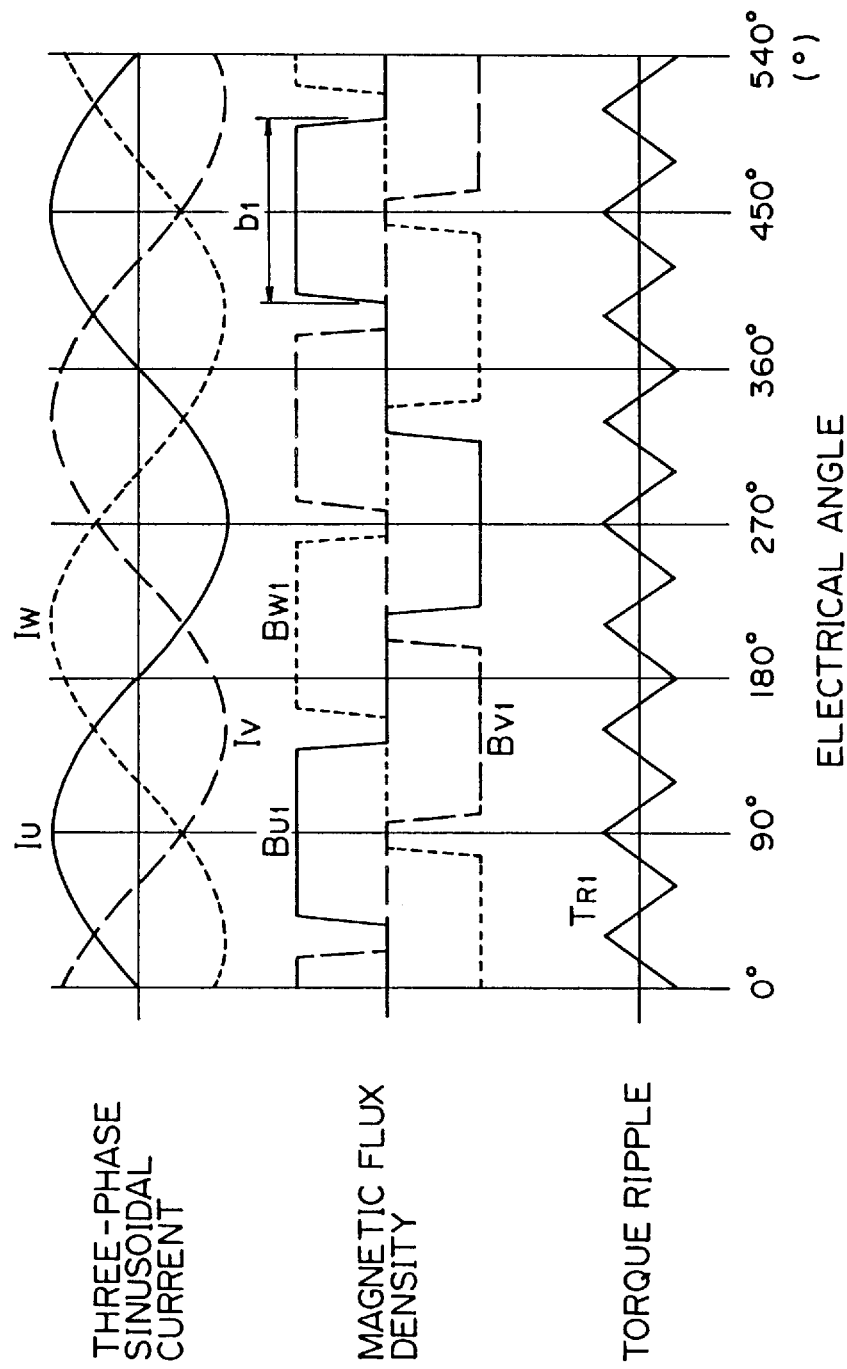
FIG. 12 is a time chart showing the waveform of three-phase sinusoidal current supplied to the first rotor portion, and the profile of the magnetic flux density and a torque ripple in the first rotor portion.

FIG. 11 is a time chart showing the waveform of three-phase sinusoidal current supplied to the second rotor portion, and the profile of the magnetic flux density and a torque ripple in the second rotor portion, and FIG. 12 is a time chart showing the waveform of three-phase sinusoidal current supplied to the first rotor portion, and the profile of the magnetic flux density and a torque ripple in the first rotor portion.

In these drawings, $I_U$, $I_V$ and $I_W$ re waveforms of three-phase sinusoidal currents supplied to the stator coils 36 for U-phase, V-phase and W-phase which are wound on the stator 32 (see FIG. 2) with a spacing of $\frac{2}{3}\pi$ (electrical angle) between every two stator coils. The variations of the three-phase sinusoidal currents with respect to time are represented as functions of the electrical angle. The currents $I_U$, $I_V$ and $I_W$ can be represented as follows:

$$I_U = I_M \sin \theta$$

$$I_V = I_M \sin (\theta + \tfrac{2}{3}\pi)$$

$$I_W = I_M \sin (\theta + \tfrac{4}{3}\pi),$$

wherein $I_m$ is the peak of the currents for U-phase, V-phase and W-phase. $B_{U1}$, $B_{V1}$ and $B_{W1}$ are the profiles of magnetic flux densities at the gaps between the permanent magnets 51 of the first rotor portion 41 and the stator coils 36 for U-phase, V-phase and W-phase. The magnetic flux is generated by each permanent magnet 51 such that the magnetic flux intersects the stator coils 36. The variations of magnetic flux densities with the rotation of the rotor 31 (i.e., with respect to time) are represented as functions of the electrical angle. $B_{U2}$, $B_{V2}$ and $B_{W2}$ are the profiles of magnetic flux densities at the gaps between the permanent magnets 52 of the second rotor portion 43 and the stator coils 36 for U-phase, V-phase and W-phase. The magnetic flux is generated by each permanent magnet 52 such that the magnetic flux intersects the stator coils 36. The variations of magnetic flux densities with the rotation of the rotor 31 (i.e., with respect to the time) are represented as functions of the electrical angle. $T_{R1}$ is the time-dependent variation of a torque ripple generated at the first rotor portion 41 which is represented as a function of the electrical angle. $T_{R2}$ is the time-dependent variation of a torque ripple generated at the second rotor portion 43 which is represented as a function of the electrical angle. Torque ripples $T_{R1}$ and $T_{R2}$ can be represented as follow:

$$\begin{aligned} T_{R1} &= KI_U B_{U1} + KI_V B_{V1} + KI_W B_{W1} \\ &= KI_m \sin\theta B_{U1} + KI_m \sin(\theta + 2/3\pi) B_{V1} + \\ &\quad KI_m \sin(\theta + 4/3\pi) B_{W1} \end{aligned}$$

-continued
$$T_{R2} = KI_U B_{U2} + KI_V B_{V2} + KI_W B_{W2}$$
$$= KI_m \sin\theta B_{U2} + KI_m \sin(\theta + 2/3\pi) B_{V2} +$$
$$KI_m \sin(\theta + 4/3\pi) B_{W2}$$

wherein K is a proportional constant.

The absolute value of the difference between the width $b_2$ of the profiles $B_{U2}$, $B_{V2}$ and $B_{W2}$ of magnetic flux densities at the second rotor portion 43 and the width $b_1$ of the profiles $B_{U1}$, $B_{V1}$ and $B_{W1}$ of magnetic flux densities at the first rotor portion 41 coincides with the absolute value $d_E$ of the difference between the electrical angles. When the absolute value $d_E$ of the difference between the electrical angles is an integral multiple of 30°, it becomes possible to form a phase difference of 180° between the torque ripple $T_{R1}$ generated at the first rotor portion 41 and the torque ripple $T_{R2}$ generated at the second rotor portion 43. Accordingly, the torque ripples are canceled out so that the overall torque ripple of the motor can be suppressed.

As described above, a slot 65 is formed between every two stator poles 64 (see FIG. 5), and the magnetic poles are separated from each other. Hence, when rotor 31 is rotated, magnetic flux passing through one stator pole 64 starts to pass through an adjacent stator pole 64. At this time, the movement of the magnetic flux becomes discontinuous when a corner of a magnet pole passes the slot 65. As a result, the attraction force between the stator 32 and the rotor 31 varies depending on vibrations in the magnetic reactance so that cogging vibration is produced in the torque (hereinafter referred to as "cogging torque").

In the present embodiment, 36 stator poles 64 are formed, and the pitch angle of the slots 65 (hereinafter referred to as "slot pitch angle") is 10°. Therefore, the absolute value $d_M$ of the difference between the mechanical angles becomes an odd multiple of the slot pitch angle.

Accordingly, when the rotor 31 is rotated, the number of stator poles 64 facing each yoke projection 61 of the first yoke 41a increases and decreases in a manner contrary to that in which the number of stator poles 64 facing each yoke projection 62 of the second yoke 43a increases and decreases.

Also, when the rotor 31 is rotated, the number of stator poles 64 facing each permanent magnet 51 of the first yoke 41a increases and decreases in a manner contrary to that in which the number of stator poles 64 facing each permanent magnet 52 of the second yoke 43a increases and decreases.

In detail, when the rotational angle of the rotor 31 changes from 0° to 5°, the number of stator poles 64 facing each yoke projection 61 of the first yoke 41a increases from 2 to 3, whereas the number of stator poles 64 facing each yoke projection 62 of the second yoke 43a decreases from 2 to 1. When the rotational angle of the rotor 31 changes from 5° to 10°, the number of stator poles 64 facing each yoke projection 61 of the first yoke 41a decreases from 3 to 2, whereas the number of stator poles 64 facing each yoke projection 62 of the second yoke 43a increases from 1 to 2.

When the rotational angle of the rotor 31 changes from 0° to 5°, the number of stator poles 64 facing each permanent magnet 51 of the first yoke 41a decreases from 4 to 3, whereas the number of stator poles 64 facing each permanent magnet 52 of the second yoke 43a increases from 4 to 5. When the rotational angle of the rotor 31 changes from 5° to 10°, the number of stator poles 64 facing each permanent magnet 51 of the first yoke 41a increases from 3 to 4, whereas the number of stator poles 64 facing each permanent magnet 52 of the second yoke 43a decreases from 5 to 4.

As a result, when current for a light load is supplied to the stator coils 36, a phase difference of 180° is produced between the cogging vibration generated at the first rotor portion 41 and the cogging vibration generated at the second rotor portion 43. Accordingly, the cogging torques are canceled out so that the overall cogging torque of the motor can be suppressed.

Next, the results of an experiment in which the torque characteristics of the motor having the above-described structure were analyzed using a finite-element method will be described.

FIG. 13 through FIG. 16 are first through fourth graphs showing variations in torque in the first embodiment. The abscissas represent the rotational angle (degree) of the rotor while the ordinates represent the torque (kgm).

In these drawings, T1 represents the first torque generated at the first rotor portion 41 (see FIG. 2), T2 represents the second torque generated at the second rotor portion 43, and T represents the overall torque generated by the motor.

To simplify the comparison among these torques, the torques were measured as follows. To obtain the data shown in FIG. 13 and FIG. 14, a rotor 31 the whole of which had the structure of the first rotor portion 41 was prepared to measure the first torque T1, and another rotor 31 the whole of which had the structure of the second rotor portion 43 was prepared to measure the second torque T2. To obtain the data shown in FIG. 15 and FIG. 16, a rotor 31 half of which had the structure of the first rotor portion 41 was prepared to measure the first torque T1, and another rotor 31 half of which had the structure of the second rotor portion 43 was prepared to measure the second torque T2.

Figure 13:
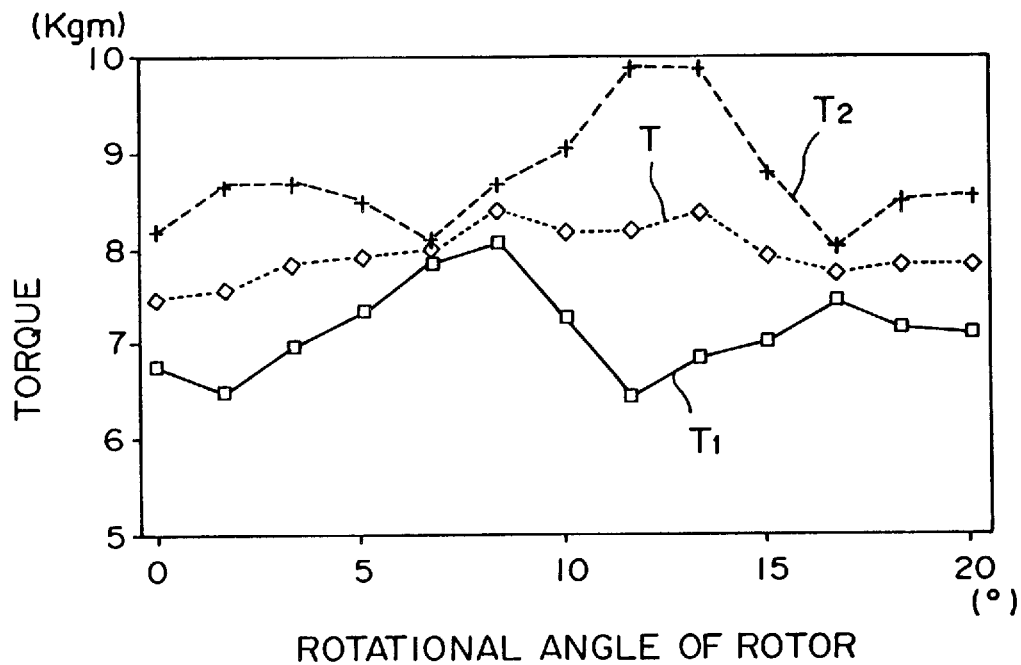
FIG. 13 through FIG. 16 are first through fourth graphs showing variations in torque in the first embodiment.
Figure 14:
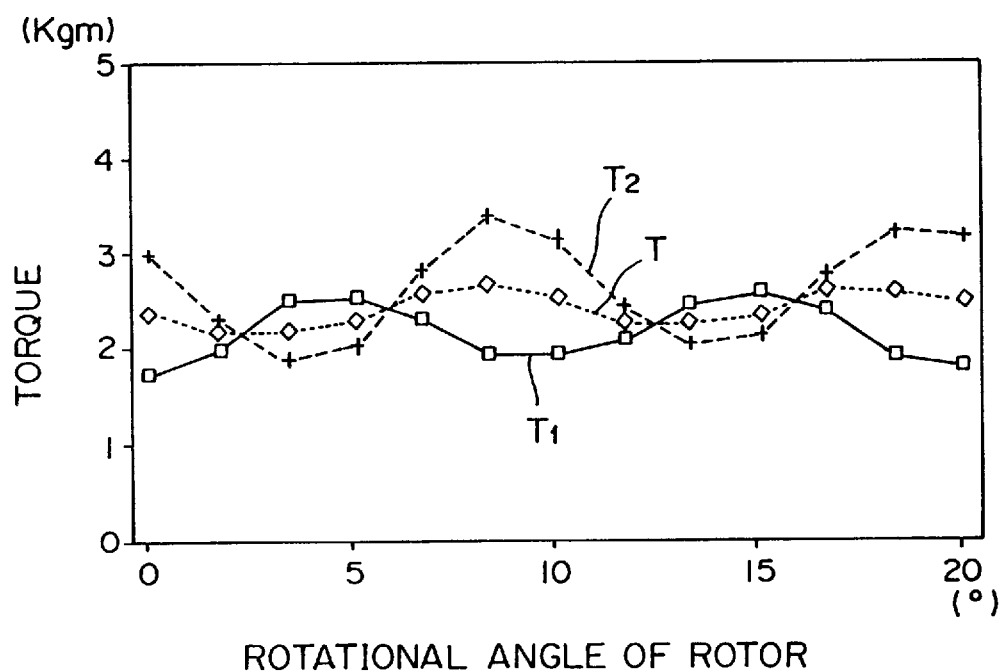
Figure 15:
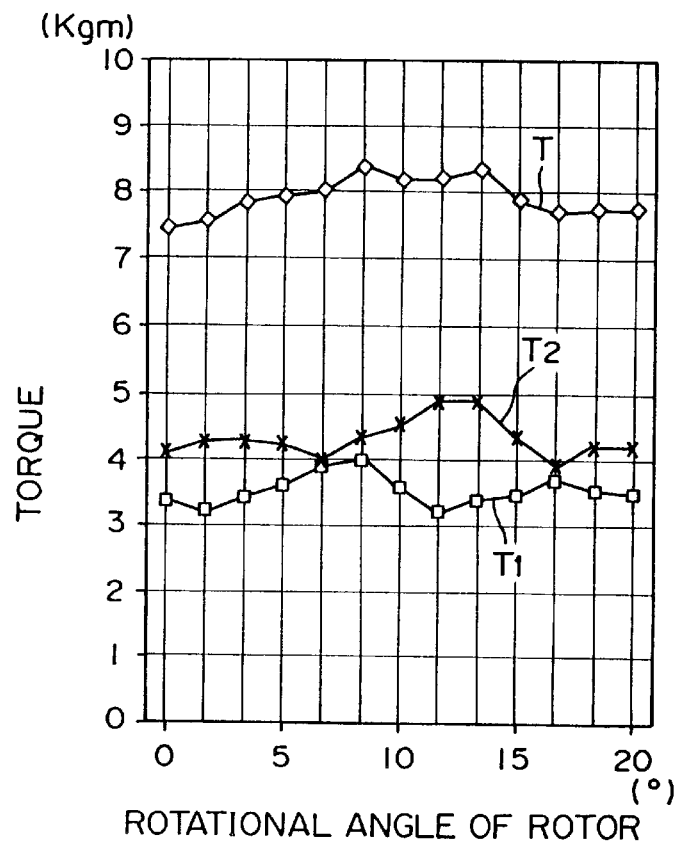
Figure 16:
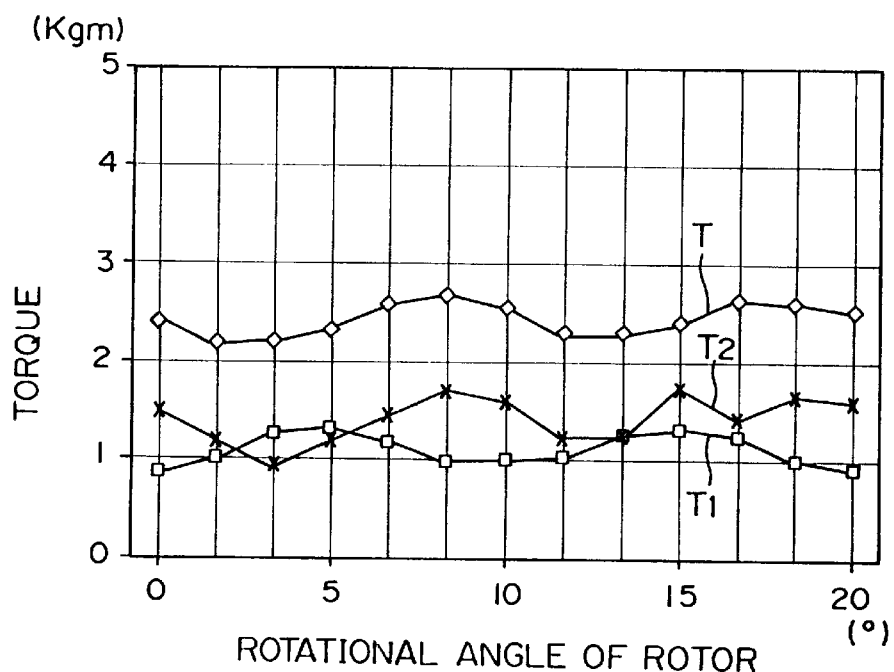

When current for a heavy load is supplied to the stator coils 36, torque ripples including twelfth and sixth vibrations are produced in the first and second torques T1 and T2, as shown in FIG. 13, due to the effect of the yoke projections 61 and 62 (see FIGS. 1 and 4). When current for a light load is supplied to the stator coils 36, cogging including twelfth vibrations are produced in the first and second torques T1 and T2, as shown in FIG. 14.

However, only slight torque ripple and cogging are produced in the composite torque T, i.e., the overall torque of the motor, whether the stator coils 36 are supplied with current for a heavy load or current for a light load. The torque ripple and the cogging torque can be completely eliminated by adjusting the axial length of the permanent magnets 51 and 52.

In the present embodiment, the rotor 31 is divided into two parts in the axial direction to form the first and second rotor portions 41 and 43. However, the rotor 31 may be divided into three parts in the axial direction to form three rotor portions. In this case, the axial length of the permanent magnets of each rotor portion is adjusted such that torque ripples and cogging torques generated at three rotor portions are canceled out. Accordingly, the torque ripple and cogging torque of the motor can be suppressed.

Next, a second embodiment of the present invention will be described.

Figure 17:
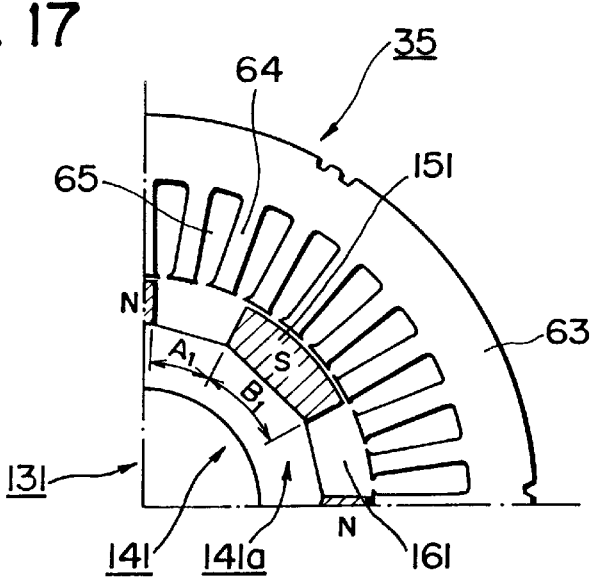
FIG. 17 through FIG. 19 are explanatory charts showing first, second and third states of the first rotor portion of a rotor according to a second embodiment of the present invention.
Figure 18:
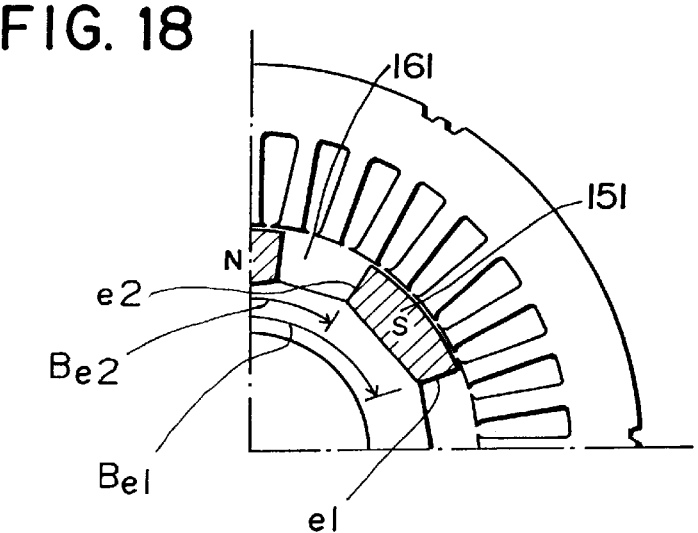
Figure 19:
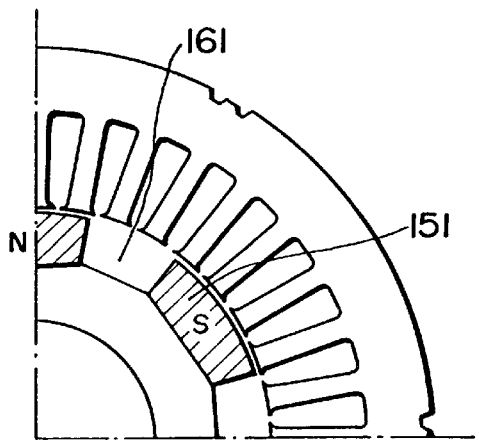
Figure 20:
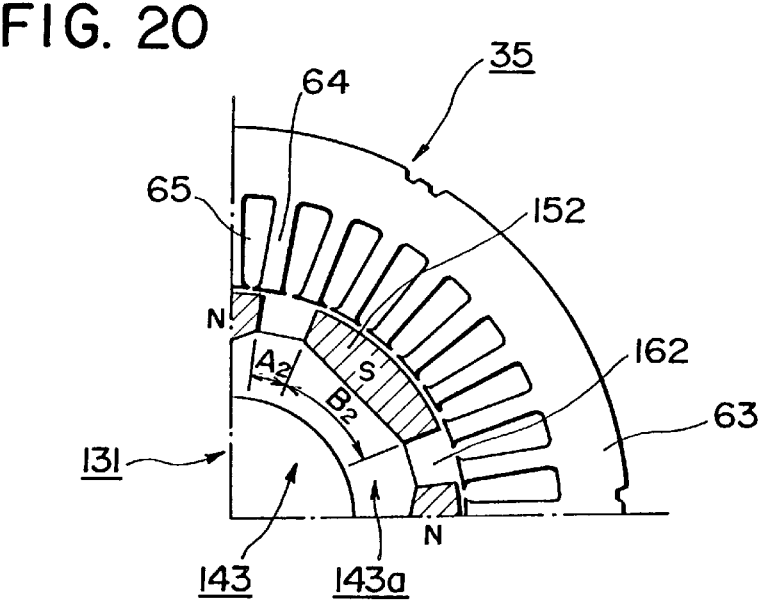
FIG. 20 through FIG. 22 are explanatory charts showing first, second and third states of the second rotor portion of the rotor according to the second embodiment.
Figure 21:
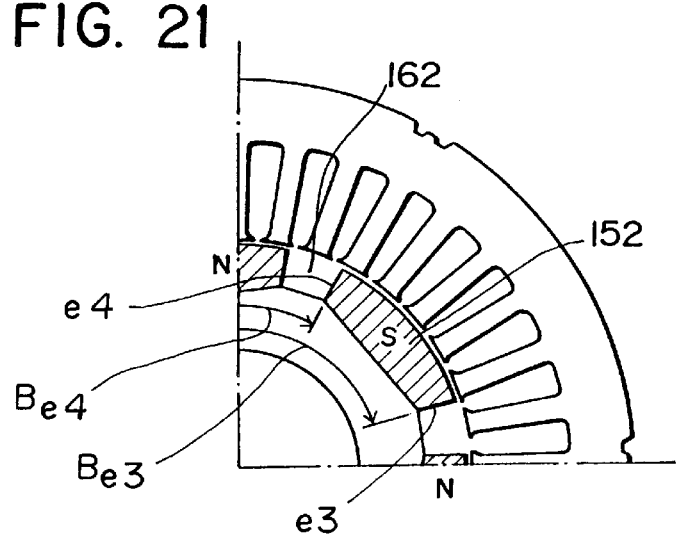
Figure 22:
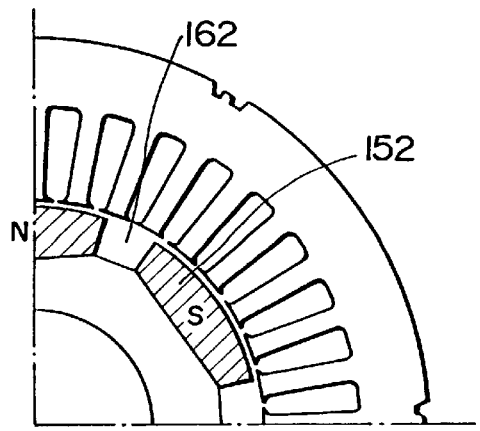

FIG. 17 through FIG. 19 are explanatory charts showing first, second and third states of the first rotor portion of a rotor according to the second embodiment of the present invention, and FIG. 20 through FIG. 22 are explanatory charts showing first, second and third states of the second rotor portion of the rotor according to the second embodiment. FIG. 17 and FIG. 20 show states where the rotational angle of the rotor 131 is 0°. FIG. 18 and FIG. 21 show states where the rotational angle of the rotor 131 is 5°. FIG. 19 and FIG. 22 show states where the rotational angle of the rotor 131 is 10°.

As shown in the drawings, the motor of the present embodiment is a permanent magnet type synchronous motor. The yoke 35 of the motor has a cylindrical stator yoke portion 63 and a plurality of stator poles 64 which project radially inward from the stator yoke portion 63. A slot 65 is formed between every two adjacent stator poles 64.

The rotor 131 of the motor has a salient pole structure. That is, permanent magnets 151 are fixed to the periphery of a first yoke 141a so that a space 161 is formed between every two permanent magnets 151. Similarly, permanent magnets 152 are fixed to the periphery of a second yoke 143a so that a space 162 is formed between every two permanent magnets 152.

In this case, each pitch angle of the permanent magnets 151 and each pitch angle of the permanent magnets 152 are both 60°. Also, the permanent magnets 151 and 152 are arranged such that the center of each permanent magnet 151 coincides with the center of each permanent magnet 152. The rotor 131 is rotated in the clockwise direction in the drawings so that rotational torque is generated in the clockwise direction.

It is assumed that the open angle (circumferential width) of each space 161 (hereinafter referred to as "space open angle") of the first rotor portion 141 and the space open angle of the second rotor portion 143 are $A_1$ and $A_2$, respectively, in mechanical angle, and that the magnetic pole open angle of the first rotor portion 141 and the magnetic pole open angle of the second rotor portion 143 are $B_1$ and $B_2$, respectively, in mechanical angle. In this case, the absolute value $d_M$ of the difference between the mechanical angles is represented as follows:

$$d_M = |A_1 - A_2| = |B_1 - B_2|.$$

Also, the absolute value $d_E$ of the difference between the electrical angles is represented as follows:

$$d_E = m \cdot |A_1 - A_2|.$$

In the present embodiment, the absolute value $d_E$ of the difference between the electrical angles is set to an integral multiple of 30°.

With this setting, a phase difference of 180° is produced between a torque ripple generated at the first rotor portion 141 and a torque ripple generated at the second rotor portion 143 when three-phase sinusoidal current is supplied to the stator coils 36 (see FIG. 2). Accordingly, the torque ripples are canceled out so that the overall torque ripple of the motor can be suppressed.

In the present embodiment, the space open angle $A_1$ of the first rotor portion 141 is set to 25° while the magnetic pole open angle $B_1$ of the first rotor portion 141 is set to 35°. Also, the space open angle $A_2$ of the second rotor portion 143 is set to 15° while the magnetic pole open angle $B_2$ of the second rotor portion 143 is set to 45°. In this case, the absolute value dM of the difference between the mechanical angles is represented as follows:

$$d_M = 10.$$

Since the number of pairs of the magnetic poles is 3, the absolute value $d_E$ of the difference between the electrical angles is represented as follows:

$$\begin{aligned} d_E &= 3 \times 10 \\ &= 30. \end{aligned}$$

Consequently, the absolute value $d_E$ of the difference between the electrical angles becomes 30°×1.

Expressed differently, each permanent magnetic salient pole 151 of the rotor 141 has a leading edge e1 and a trailing edge e2 in the clockwise circumferential direction and each permanent magnetic salient pole 152 of the rotor 143 has a leading edge e3 and a trailing edge e4 in the clockwise circumferential direction. The angle $B_{e1}$ that the edge e1 of the magnet 151 makes relative to a zero electrical stator angle differs in electrical angle from the angle $B_{e3}$ that the edge e3 of the corresponding magnet 152 of the same polarity makes relative to the zero stator angle by $$+15° \times n + 360° \times k$$

and the angle $B_{e2}$ that the edge e2 of the magnet 151 makes relative to the zero stator angle differs in electrical angle from the angle $B_{e4}$ that the edge e4 of corresponding magnet 152 of the same polarity makes relative to the zero stator angle by $$-15° \times n + 360° \times k$$

wherein n and k are integral numbers. In the present embodiment n=1 so that when k=0 (magnet 151 is centered at the same electrical angle as magnet 152 relative to zero stator angle) the difference in electrical angle between e1 and e3 ($B_{e3} - B_{e1}$) is +15° and the difference in electrical angle between e2 and e4 ($B_{e4} - B_{e2}$) is -15°.

In the present embodiment, 36 stator poles 64 are formed. Therefore, the slot pitch angle becomes 10°, and the absolute value $d_M$ of the difference between the mechanical angles becomes an odd multiple of the slot pitch angle. Accordingly, when the rotor 131 is rotated, the number of stator poles 64 facing each space 161 of the first yoke 141a increases and decreases in a manner contrary to that in which the number of stator poles 64 facing each space 162 of the second yoke 143a increases and decreases.

Also, when the rotor 131 is rotated, the number of stator poles 64 facing each permanent magnet 151 of the first yoke 141a increases and decreases in a manner contrary to that in which the number of stator poles 64 facing each permanent magnet 152 of the second yoke 143a increases and decreases.

As a result, when current for a light load is supplied to the stator coils 36 (FIG. 2), a phase difference of 180° is produced between a cogging vibration generated at the first rotor portion 141 and a cogging vibration generated at the second rotor portion 143. Accordingly, the cogging torques are canceled out so that the overall cogging torque of the motor can be suppressed.

Figure 23:
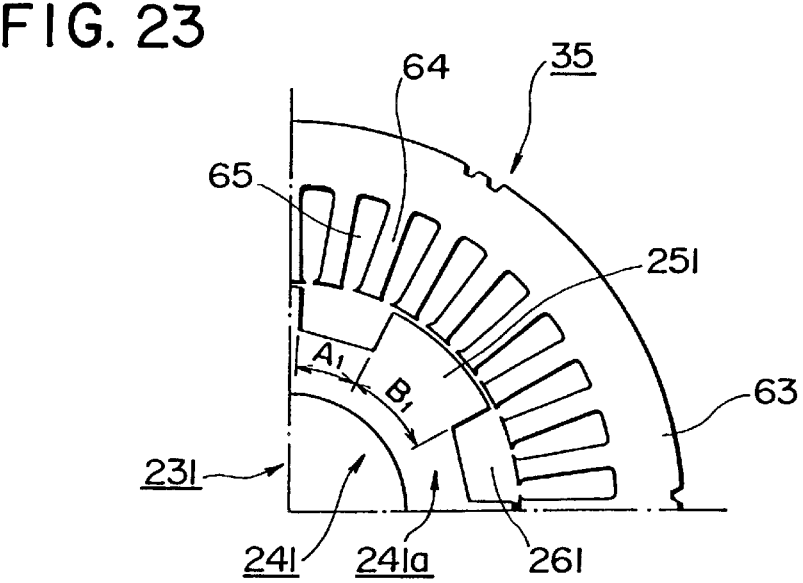
FIG. 23 through FIG. 25 are explanatory charts showing first, second and third states of the first rotor portion of a rotor according to a third embodiment of the present invention.
Figure 24:
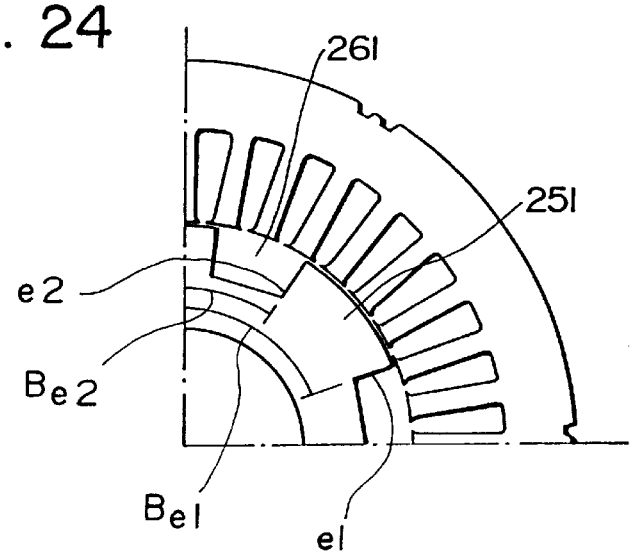
Figure 25:
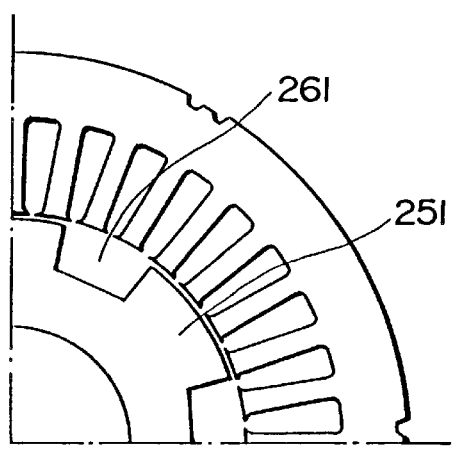
Figure 26:
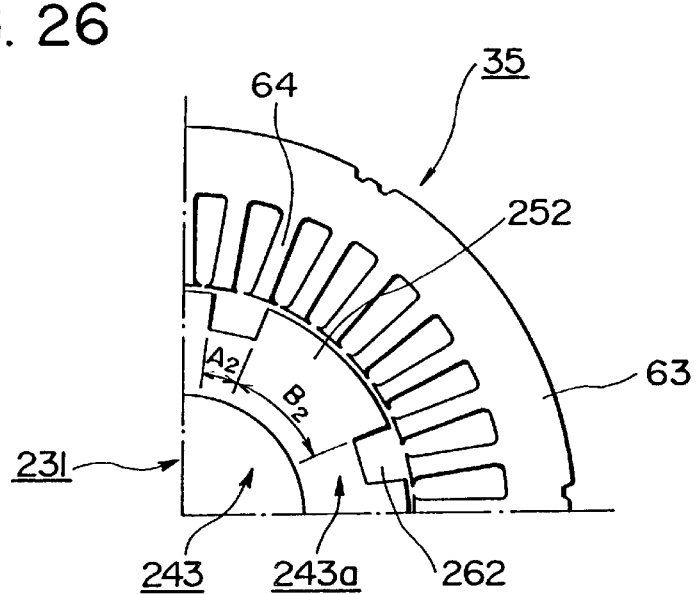
FIG. 26 through FIG. 28 are explanatory charts showing first, second and third states of the second rotor portion of the rotor according to the third embodiment.
Figure 27:
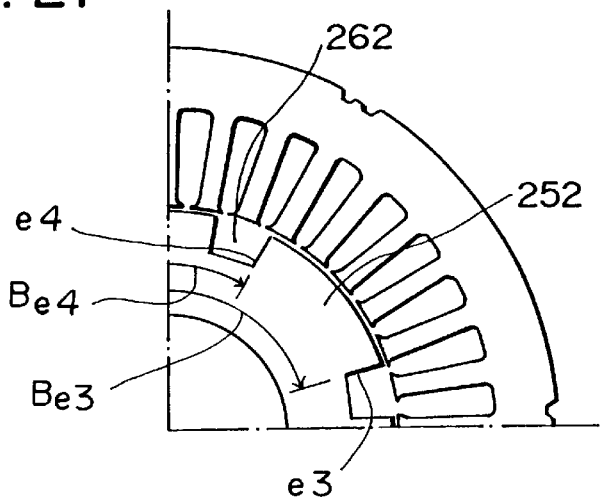
Figure 28:
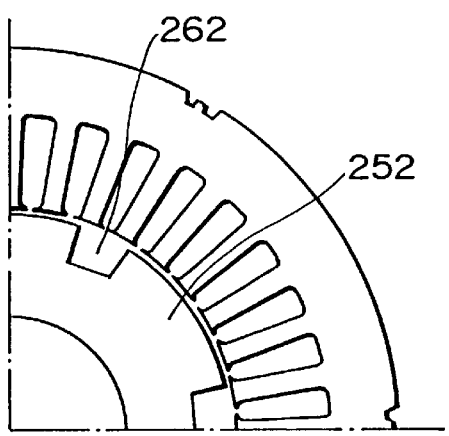

Next, a third embodiment of the present invention will be described. FIG. 23 through FIG. 25 are explanatory charts showing first, second and third states of the first rotor portion of a rotor according to the third embodiment of the present invention, and FIG. 26 through FIG. 28 are explanatory charts showing first, second and third states of the second rotor portion of the rotor according to the third embodiment. FIG. 23 and FIG. 26 show states where the rotational angle of the rotor 231 is 0°. FIG. 24 and FIG. 27 show states where the rotational angle of the rotor 231 is 5°. FIG. 25 and FIG. 28 show states where the rotational angle of the rotor 231 is 10°.

As shown in the drawings, the motor of the present embodiment is a reluctance motor. The yoke 35 of the motor has a cylindrical stator yoke portion 63 and a plurality of stator poles 64 which project radially inward from the stator yoke portion 63. A slot 65 is formed between every two adjacent stator poles 64.

In the rotor 231 of the motor, salient poles 251 are fixed to the periphery of a first yoke 241a so that a space 261 is formed between every two salient poles 251. Similarly, salient poles 252 are fixed to the periphery of a second yoke 243a so that a space 262 is formed between every two salient poles 252. In this case, the pitch angle of the salient poles 251 and the pitch angle of the salient poles 252 are both 60°. Also, the salient poles 251 and 252 are arranged such that the center of each salient pole 251 coincides with the center of each salient pole 252. The rotor 231 is rotated in the clockwise direction in the drawings so that rotational torque is generated in the clockwise direction.

It is assumed that the space open angle of the first rotor portion 241 and the space open angle of the second rotor portion 243 are $A_1$ and $A_2$, respectively, in mechanical angle, and that the open angle (circumferential width) of each salient pole 251 (hereinafter referred to as "salient pole open angle") of the first rotor portion 241 and the salient pole open angle of the second rotor portion 243 are $B_1$ and $B_2$, respectively, in mechanical angle. In this case, the absolute value $d_M$ of the difference between the mechanical angles is represented as follows:

$$d_M = |A_1 - A_2| = |B_1 - B_2|.$$

Also, the absolute value $d_E$ of the difference between the electrical angles is represented as follows:

$$d_E = m \cdot |A_1 - A_2|.$$

In the present embodiment, the absolute value $d_E$ of the difference between the electrical angles is set to an integral multiple of 30°.

With this setting, a phase difference of 180° is produced between a torque ripple generated at the first rotor portion 241 and a torque ripple generated at the second rotor portion 243 when three-phase sinusoidal current is supplied to the stator coils 36 (see FIG. 2). Accordingly, the torque ripples are canceled out so that the overall torque ripple of the motor can be suppressed.

In the present embodiment, the space open angle $A_1$ of the first rotor portion 241 is set to 25° while the salient pole open angle $B_1$ of the first rotor portion 241 is set to 35°. Also, the space open angle $A_2$ of the second rotor portion 243 is set to 15° while the salient pole open angle $B_2$ of the second rotor portion 243 is set to 45°.

Therefore, the absolute value $d_M$ of the difference between the mechanical angles becomes 10°, and the absolute value $d_E$ of the difference between the electrical angles becomes 30°, which is 30°×1.

Expressed differently, each salient pole 251 of the rotor 241 has a leading edge e1 and a trailing edge e2 in the clockwise circumferential direction and each salient pole 252 of the rotor 243 has a leading edge e3 and a trailing edge e4 in the clockwise circumferential direction. The angle $B_{e1}$ that the edge e1 of the salient pole 251 makes relative to a zero stator angle differs in electrical angle from the angle $B_{e3}$ that the edge e3 of the corresponding salient pole 252 of the same polarity makes relative to the zero stator angle by +15°×n+360°×k and the angle $B_{e2}$ that the edge e2 of the salient pole 251 makes relative to the zero stator angle differs in electrical angle from the angle $B_{e4}$ that the edge e4 of corresponding salient pole 252 of the same polarity makes relative to the zero stator angle by −15°×n+360°×k wherein n and k are integral numbers. In the present embodiment n=1 so that when k=0 (salient pole 251 is centered at the same electrical angle as salient pole 252 relative to the zero stator angle) the difference in electrical angle between e1 and e3 ($B_{e3} - B_{e1}$) is +15° and the difference in electrical angle between e2 and e4 ($B_{e4} - B_{e2}$) is −15°.

In the present embodiment, 36 stator poles 64 are formed. Therefore, the slot pitch angle becomes 10°, and the absolute value $d_M$ of the difference between the mechanical angles becomes an odd multiple of the slot pitch angle. Accordingly, when the rotor 231 is rotated, the number of stator poles 64 facing each space 261 of the first yoke 241a increases and decreases in a manner contrary to that in which the number of stator poles 64 facing each space 262 of the second yoke 243a increases and decreases.

Also, when the rotor 231 is rotated, the number of stator poles 64 facing each salient pole 251 of the first yoke 241a increases and decreases in a manner contrary to that in which the number of stator poles 64 facing each salient pole 252 of the second yoke 243a increases and decreases.

With this setting, when current for a light load is supplied to the stator coils 36, a phase difference of 180° is produced between a cogging vibration generated at the first rotor portion 241 and a cogging vibration generated at the second rotor portion 243. Accordingly, the cogging torques are canceled out so that the overall cogging torque of the motor can be suppressed.

Next, a fourth embodiment of the present invention will be described.

Figure 29:
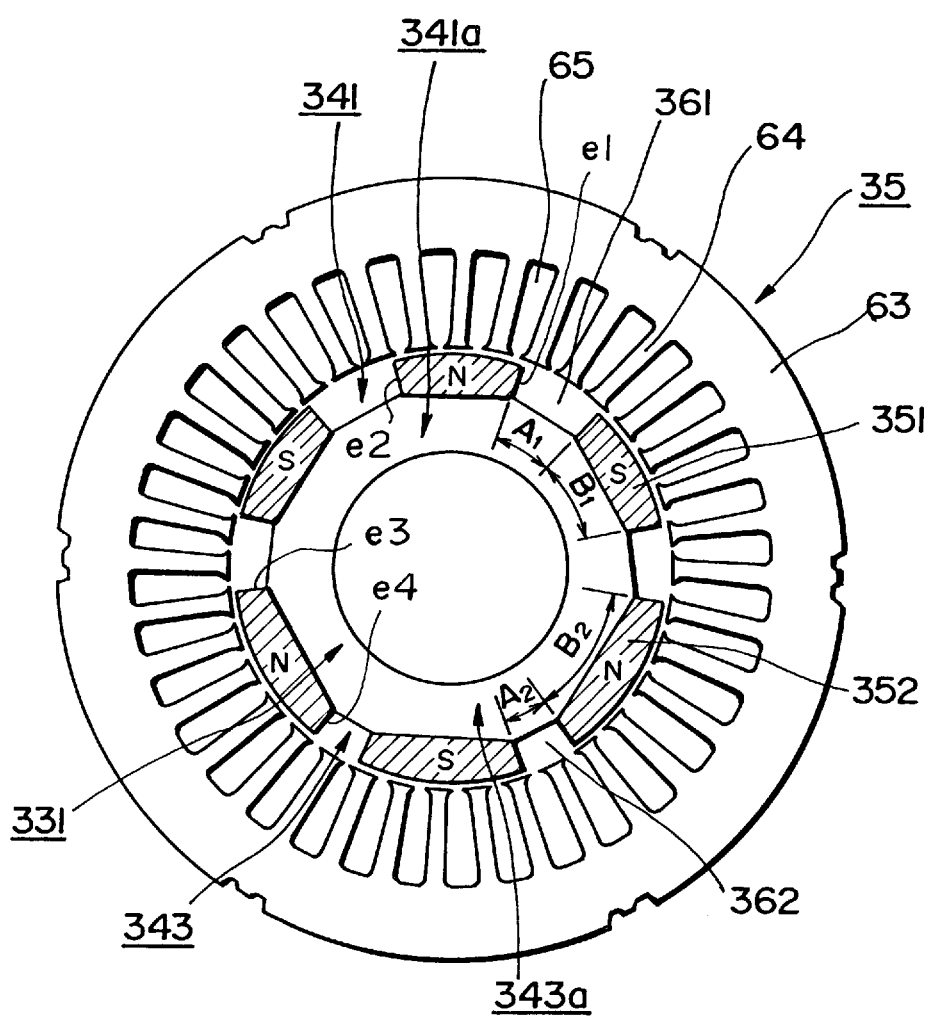
FIG. 29 is a sectional view of a motor according to a fourth embodiment of the present invention.

FIG. 29 is a sectional view of a motor according to the fourth embodiment of the present invention.

As shown in this drawing, the motor of the present embodiment is a permanent magnet type synchronous motor. The yoke 35 of the motor has a cylindrical stator yoke portion 63 and a plurality of stator poles 64 which project radially inward from the stator yoke portion 63. A slot 65 is formed between every two adjacent stator poles 64.

The rotor 331 of the motor has a salient pole structure and is divided in the circumferential direction. That is, the rotor 331 is formed by a first rotor portion 341 and a second rotor portion 343. In the first rotor portion 341, permanent magnets 351 are fixed to the periphery of a first yoke portion 341a so that a space 361 is formed between every two permanent magnets 351. Similarly, in the second rotor portion 343, permanent magnets 352 are fixed to the periphery of a second yoke portion 343a so that a space 362 is formed between every two permanent magnets 352. In the present embodiment, the pitch angle of the permanent magnets 351 and the pitch angle of the permanent magnets 352 are both 60°.

It is assumed that the space open angle of the first rotor portion 341 and the space open angle of the second rotor portion 343 are $A_1$ and $A_2$, respectively, in mechanical angle, and that the magnetic pole open angle of the first rotor portion 341 and the magnetic pole open angle of the second rotor portion 343 are $B_1$ and $B_2$, respectively, in mechanical angle. In this case, the absolute value $d_M$ of the difference between the mechanical angles is represented as follows:

$$d_M = |A_1 - A_2| = |B_1 - B_2|.$$

Also, the absolute value $d_E$ of the difference between the electrical angles is represented as follows:

$$d_E = m \cdot |A_1 - A_2|.$$

In the present embodiment, the absolute value $d_E$ of the difference between the electrical angles is set to an integral multiple of 30°.

With this setting, a phase difference of 180° is produced between a torque ripple generated at the first rotor portion 341 and a torque ripple generated at the second rotor portion 343 when three-phase sinusoidal current is supplied to the stator coils 36 (see FIG. 2). Accordingly, the torque ripples are canceled out so that the overall torque ripple of the motor can be suppressed.

In the present embodiment, the space open angle $A_1$ of the first rotor portion 341 is set to 25° while the magnetic pole open angle $B_1$ of the first rotor portion 341 is set to 35°. Also, the space open angle $A_2$ of the second rotor portion 343 is set to 15° while the magnetic pole open angle $B_2$ of the second rotor portion 343 is set to 45°.

Therefore, the absolute value $d_M$ of the difference between the mechanical angles becomes 10°, and the absolute value $d_E$ of the difference between the electrical angles becomes 30°, which is 30°×1.

Expressed differently, each magnet 351 of the rotor portion 341 has a leading edge e1 and a trailing edge e2 in the clockwise circumferential direction and each magnet 352 of the rotor portion 343 has a leading edge e3 and a trailing edge e4 in the clockwise circumferential direction. The angle that the edge e1 of the magnet 351 makes relative to a zero stator angle differs in electrical angle from the angle that the edge e3 of the corresponding magnet 352 of the same polarity makes relative to the zero stator angle by $$+15°\times n+360°\times k$$

and the angle that the edge e2 of the magnet 351 makes relative to the zero stator angle differs in electrical angle from the angle that the edge e4 of the corresponding magnet 352 of the same polarity makes relative to the zero stator angle by $$-15°\times n+360°\times k$$

wherein n and k are integral numbers. In the present embodiment n=1 so that the difference in electrical angle between e1 and e3 is +15°+360°×k and the difference in electrical angle between e2 and e4 is −15°+360°×k.

In the present embodiment, 36 stator poles 64 are formed. Therefore, the slot pitch angle becomes 10°, and the absolute value $d_M$ of the difference between the mechanical angles becomes an odd multiple of the slot pitch angle.

Accordingly, when the rotor 331 is rotated, the number of stator poles 64 facing each space 361 of the first yoke 341a increases and decreases in a manner contrary to that in which the number of stator poles 64 facing each space 362 of the second yoke 343a increases and decreases. Also, when the rotor 331 is rotated, the number of stator poles 64 facing each permanent magnet 351 of the first yoke 341a increases and decreases in a manner contrary to that in which the number of stator poles 64 facing each permanent magnet 352 of the second yoke 343a increases and decreases.

As a result, when current for a light load is supplied to the stator coils 36, a phase difference of 180° is produced between a cogging vibration generated at the first rotor portion 341 and a cogging vibration generated at the second rotor portion 343. Accordingly, the cogging torques are canceled out so that the overall cogging torque of the motor can be suppressed.

Next, a fifth embodiment of the present invention will be described.

Figure 30:
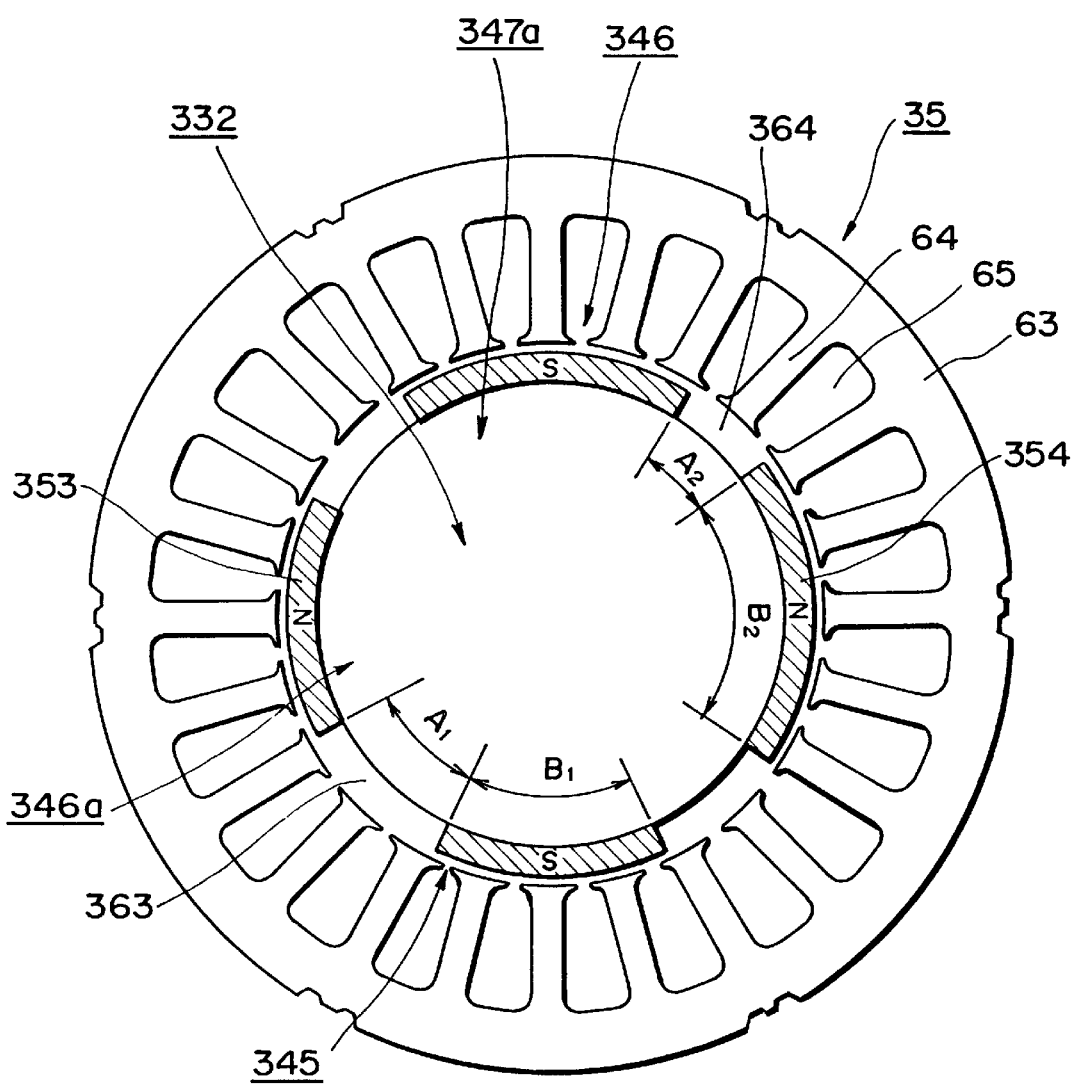
FIG. 30 is a sectional view of a motor according to a fifth embodiment of the present invention.

FIG. 30 is a sectional view of a motor according to the fifth embodiment of the present invention.

As shown in this drawing, the motor of the present embodiment is a permanent magnet type synchronous motor. The yoke 35 of the motor has a cylindrical stator yoke portion 63 and a plurality of stator poles 64 which project radially inward from the stator yoke portion 63. A slot 65 is formed between every two adjacent stator poles 64.

The rotor 332 of the motor has a salient pole structure and is divided in the circumferential direction. That is, the rotor 332 is formed by a first rotor portion 345 and a second rotor portion 346. In the first rotor portion 345, permanent magnets 353 are fixed to the periphery of a first yoke portion 346a so that a space 363 is formed between every two permanent magnets 353. Similarly, in the second rotor portion 346, permanent magnets 354 are fixed to the periphery of a second yoke portion 347a so that a space 364 is formed between every two permanent magnets 354. In the present embodiment, the pitch angle of the permanent magnets 353 and the pitch angle of the permanent magnets 354 are both 90°.

It is assumed that the space open angle of the first rotor portion 345 and the space open angle of the second rotor portion 346 are $A_1$ and $A_2$, respectively, in mechanical angle, and that the magnetic pole open angle of the first rotor portion 345 and the magnetic pole open angle of the second rotor portion 346 are $B_1$ and $B_2$, respectively, in mechanical angle. In this case, the absolute value $d_M$ of the difference between the mechanical angles is represented as follows:

$$d_M=|A_1-A_2|=|B_1-B_2|.$$

Also, the absolute value $d_E$ of the difference between the electrical angles is represented as follows:

$$d_E=m\cdot|A_1-A_2|.$$

In the present embodiment, the absolute value $d_E$ of the difference between the electrical angles is set to an integral multiple of 30°.

With this setting, a phase difference of 180° is produced between a torque ripple generated at the first rotor portion 345 and a torque ripple generated at the second rotor portion 346 when three-phase sinusoidal current is supplied to the stator coils 36 (see FIG. 2). Accordingly, the torque ripples are canceled out so that the overall torque ripple of the motor can be suppressed.

In the present embodiment, the space open angle $A_1$ of the first rotor portion 345 is set to 37.5° while the magnetic pole open angle $B_1$ of the first rotor portion 345 is set to 52.5°. Also, the space open angle $A_2$ of the second rotor portion 346 is set to 22.5° while the magnetic pole open angle $B_2$ of the second rotor portion 346 is set to 67.5°. Therefore, the absolute value dM of the difference between the mechanical angles becomes 15°, and the absolute value $d_E$ of the difference between the electrical angles becomes 30°, which is 30°×1.

In the present embodiment, 24 stator poles 64 are formed. Therefore, the slot pitch angle becomes 15°, and the absolute value $d_M$ of the difference between the mechanical angles becomes an odd multiple of the slot pitch angle.

Accordingly, when the rotor 332 is rotated, the number of stator poles 64 facing each space 363 of the first yoke portion 346a increases and decreases in a manner contrary to that in which the number of stator poles 64 facing each space 364 of the second yoke portion 347a increases and decreases.

Also, when the rotor 332 is rotated, the number of stator poles 64 facing each permanent magnet 353 of the first yoke portion 346a increases and decreases in a manner contrary to that in which the number of stator poles 64 facing each permanent magnet 354 of the second yoke portion 347a increases and decreases.

As a result, when current for a light load is supplied to the stator coils 36, a phase difference of 180° is produced between a cogging vibration generated at the first rotor portion 345 and a cogging vibration generated at the second rotor portion 346. Accordingly, the cogging torques are canceled out so that the overall cogging torque of the motor can be suppressed.

Next, a sixth embodiment of the present invention will be described.

Figure 31:
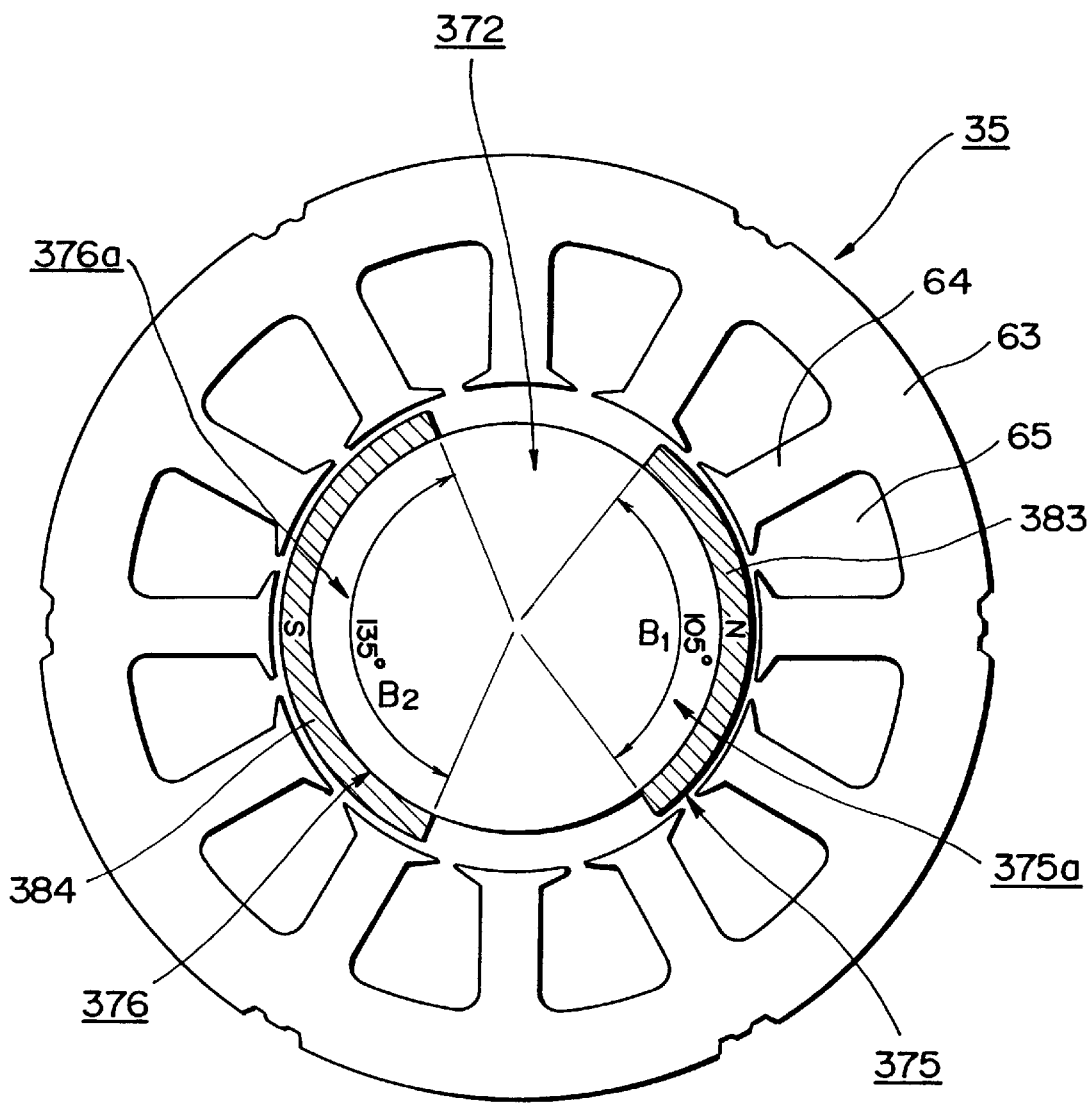
FIG. 31 is a sectional view of a motor according to a sixth embodiment of the present invention.

FIG. 31 is a sectional view of a motor according to the sixth embodiment of the present invention.

As shown in this drawing, the motor of the present embodiment is a permanent magnet type synchronous motor. The yoke 35 of the motor has a cylindrical stator yoke portion 63 and a plurality of stator poles 64 which project radially inward from the stator yoke portion 63. A slot 65 is formed between every two adjacent stator poles 64.

The rotor 372 of the motor has a salient pole structure and is divided in the circumferential direction. That is, the rotor 372 is formed by a first rotor portion 375 and a second rotor portion 376. In the first rotor portion 375, a permanent magnet 383 is fixed to the periphery of a first yoke portion 375a, and in the second rotor portion 376, a permanent magnet 384 is fixed to the periphery of a second yoke portion 376a. In the present embodiment, the pitch angles of the permanent magnets 383 and 384 are both 180°.

It is assumed that the magnetic pole open angle of the first rotor portion 375 and the magnetic pole open angle of the second rotor portion 376 are $B_1$ and $B_2$, respectively, in mechanical angle. In this case, the absolute value $d_M$ of the difference between the mechanical angles is represented as follows:

$$d_M = |B_1 - B_2|.$$

Also, the absolute value $d_E$ of the difference between the electrical angles is represented as follows:

$$d_E = m \cdot |B_1 - B_2|.$$

In the present embodiment, the absolute value $d_E$ of the difference between the electrical angles is set to an integral multiple of 30°.

With this setting, a phase difference of 180° is produced between a torque ripple generated at the first rotor portion 375 and a torque ripple generated at the second rotor portion 376 when three-phase sinusoidal current is supplied to the stator coils 36 (see FIG. 2). Accordingly, the torque ripples are canceled out so that the overall torque ripple of the motor can be suppressed.

In the present embodiment, the magnetic pole open angle $B_1$ of the first rotor portion 375 is set to 105°, and the magnetic pole open angle $B_2$ of the second rotor portion 376 is set to 135°.

Therefore, the absolute value $d_M$ of the difference between the mechanical angles becomes 30°. Since there is a single pair of magnetic poles, the absolute value $d_E$ of the difference between the electrical angles becomes 30°, which is 30°×1.

In the present embodiment, 12 stator poles 64 are formed. Therefore, the slot pitch angle becomes 30°, and the absolute value $d_M$ of the difference between the mechanical angles becomes an odd multiple of the slot pitch angle.

Accordingly, when the rotor 372 is rotated, the number of stator poles 64 facing the permanent magnet 383 of the first yoke portion 375a increases and decreases in a manner contrary to that in which the number of stator poles 64 facing the permanent magnet 384 of the second yoke portion 376a increases and decreases.

As a result, when current for a light load is supplied to the stator coils 36, a phase difference of 180° is produced between a cogging vibration generated at the first rotor portion 375 and a cogging vibration generated at the second rotor portion 376. Accordingly, the cogging torques are canceled out so that the overall cogging torque of the motor can be suppressed.

Next, a seventh embodiment of the present invention will be described.

Figure 32:
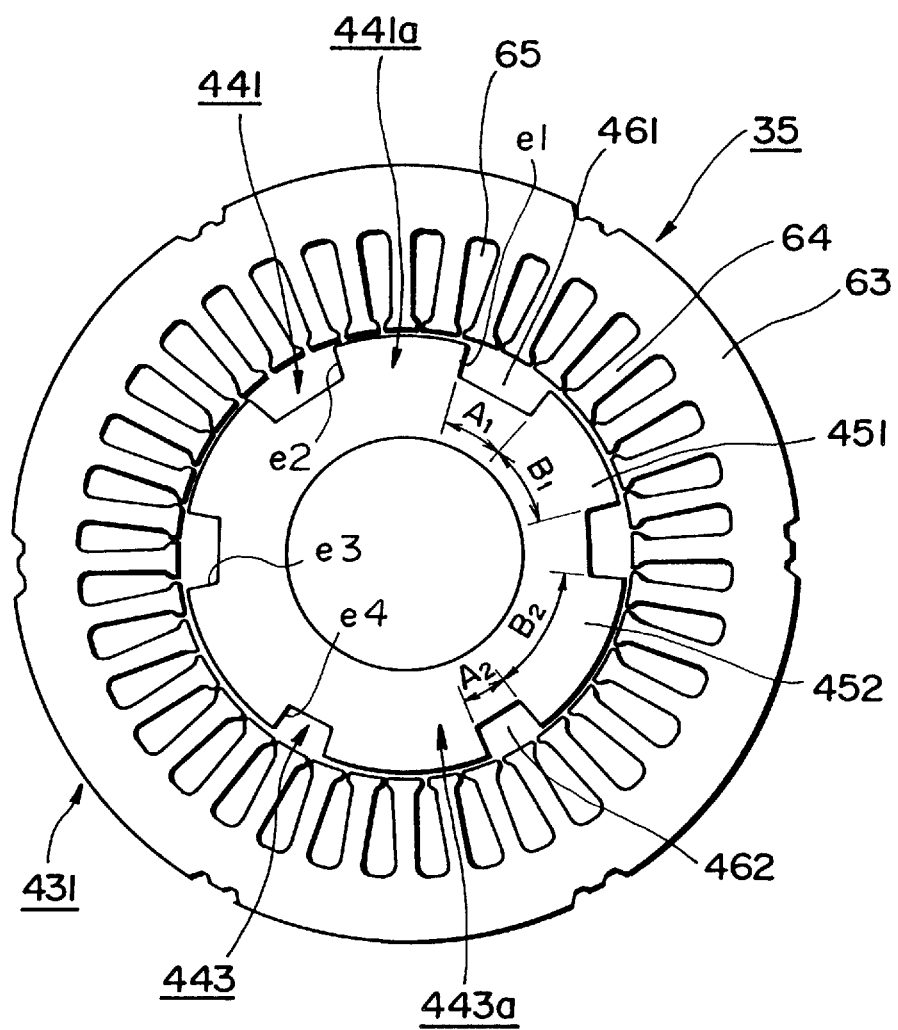
FIG. 32 is a sectional view of a motor according to a seventh embodiment of the present invention.

FIG. 32 is a sectional view of a motor according to the seventh embodiment of the present invention.

As shown in this drawing, the motor of the present embodiment is a reluctance motor. The yoke 35 of the motor has a cylindrical stator yoke portion 63 and a plurality of stator poles 64 which project radially inward from the stator yoke portion 63. A slot 65 is formed between every two adjacent stator poles 64.

The rotor 431 of the motor is divided into two parts in the circumferential direction. That is, the rotor 431 is formed by a first rotor portion 441 and a second rotor portion 443. In the first rotor portion 441, salient poles 451 are fixed to the periphery of a first yoke portion 441a so that a space 461 is formed between every two salient poles 451. Similarly, in the second rotor portion 443, salient poles 452 are fixed to the periphery of a second yoke portion 443a so that a space 462 is formed between every two salient poles 452. In the present embodiment, the pitch angle of the salient poles 451 and the pitch angle of the salient poles 452 are both 60°.

It is assumed that the space open angle of the first rotor portion 441 and the space open angle of the second rotor portion 443 are $A_1$ and $A_2$, respectively, in mechanical angle, and that the magnetic pole open angle of the first rotor portion 441 and the magnetic pole open angle of the second rotor portion 443 are $B_1$ and $B_2$, respectively, in mechanical angle. In this case, the absolute value $d_M$ of the difference between the mechanical angles is represented as follows:

$$d_M = |A_1 - A_2| = |B_1 - B_2|.$$

Also, the absolute value $d_E$ of the difference between the electrical angles is repesented as follows:

$$d_E = m \cdot |A_1 - A_2|.$$

In the present embodiment, the absolute value $d_E$ of the difference between the electrical angles is set to an integral multiple of 30°.

With this setting, a phase difference of 180° is produced between a torque ripple generated at the first rotor portion 441 and a torque ripple generated at the second rotor portion 443 when three-phase sinusoidal current is supplied to the stator coils 36 (see FIG. 2). Accordingly, the torque ripples are canceled out so that the overall torque ripple of the motor can be suppressed.

In the present embodiment, the space open angle $A_1$ of the first rotor portion 441 is set to 25° while the magnetic pole open angle $B_1$ of the first rotor portion 441 is set to 35°. Also, the space open angle $A_2$ of the second rotor portion 443 is set to 15° while the magnetic pole open angle $B_2$ of the second rotor portion 443 is set to 45°.

Therefore, the absolute value $d_M$ of the difference between the mechanical angles becomes 10°. Since there are three pairs of magnetic poles, the absolute value $d_E$ of the difference between the electrical angles becomes 30°, which is 30°×1.

Expressed differently, each salient pole 451 of the rotor portion 441 has a leading edge e1 and a trailing edge e2 in the clockwise circumferential direction and each salient pole 452 of the rotor portion 443 has a leading edge e3 and a trailing edge e4 in the clockwise circumferential direction.

The angle that the edge e1 of the salient pole 451 makes relative to a zero stator angle differs in electrical angle from the angle that the edge e3 of the corresponding salient pole 452 of the same polarity makes relative to the zero stator angle by $$+15°\times n+360°\times k$$

and the angle that the edge e2 of the salient pole 451 makes relative to a zero stator angle differs in electrical angle from the angle that the edge e4 of corresponding salient pole 452 of the same polarity makes relative to the zero stator angle by $$-15°\times n+360°\times k$$

wherein n and k are integral numbers. In the present embodiment n=1 so that the difference in electrical angle between e1 and e3 is +15°+360°×k and the difference in electrical angle between e2 and e4 is −15°+360°×k.

In the present embodiment, 36 stator poles 64 are formed. Therefore, the slot pitch angle becomes 10°, and the absolute value $d_M$ of the difference between the mechanical angles becomes an odd multiple of the slot pitch angle.

Accordingly, when the rotor 431 is rotated, the number of stator poles 64 facing each space 461 of the first yoke portion 441a increases and decreases in a manner contrary to that in which the number of stator poles 64 facing each space 462 of the second yoke portion 443a increases and decreases.

Also, when the rotor 431 is rotated, the number of stator poles 64 facing each salient pole 451 of the first yoke portion 441a increases and decreases in a manner contrary to that in which the number of stator poles 64 facing each permanent magnet 452 of the second yoke portion 443a increases and decreases.

As a result, when current for a light load is supplied to the stator coils 36, a phase difference of 180° is produced between a cogging vibration generated at the first rotor portion 441 and a cogging vibration generated at the second rotor portion 443. Accordingly, the cogging torques are canceled out so that the overall cogging torque of the motor can be suppressed.

Next, an eighth embodiment of the present invention will be described.

In the present embodiment, the stator poles 64 (see FIG. 5) and slots 65 in the first and second embodiments are skewed by an amount corresponding to one slot pitch angle (10°).

Figure 33:
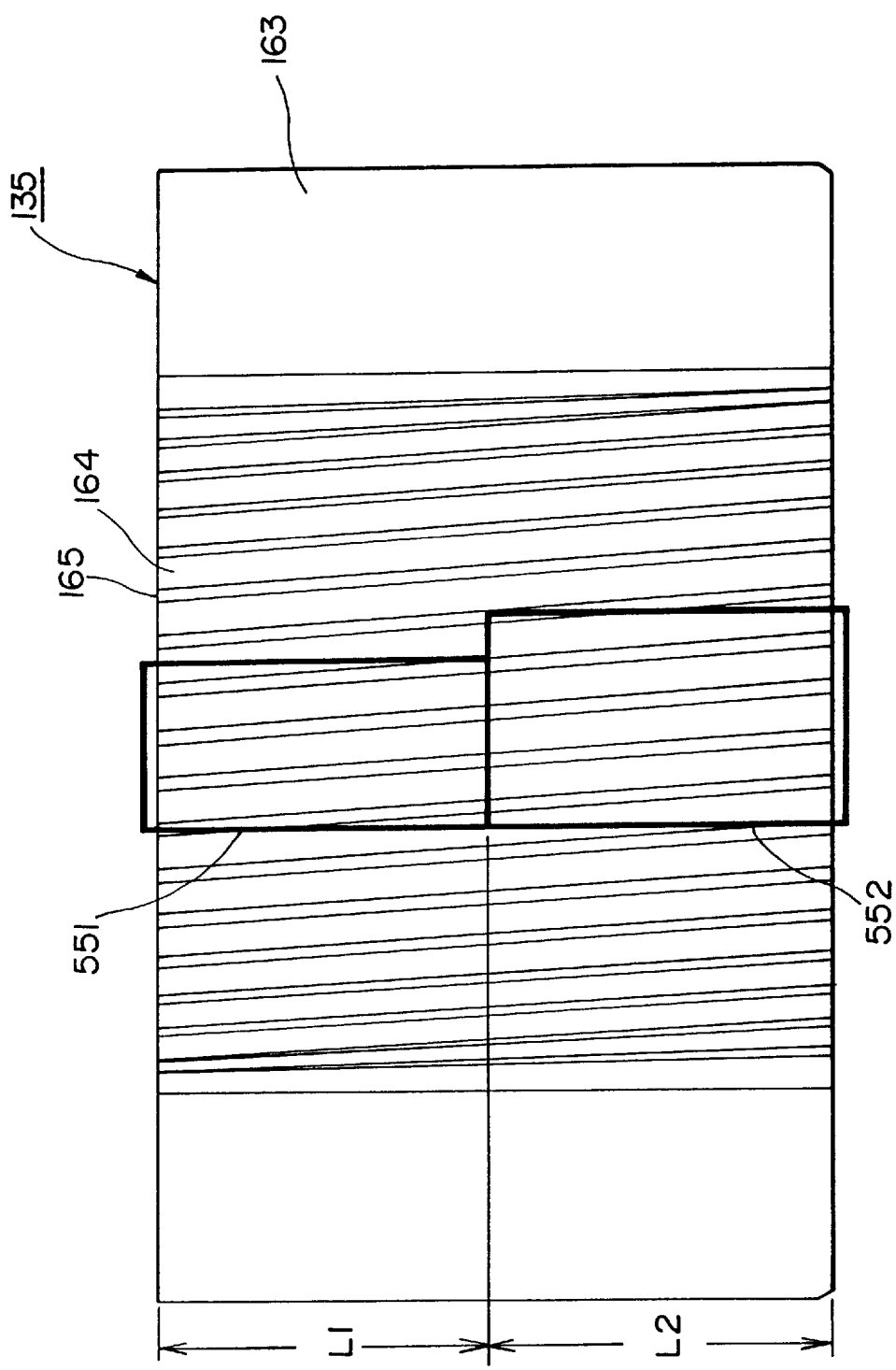
FIG. 33 is a sectional view of a main portion of a motor according to an eighth embodiment of the present invention.

FIG. 33 is a sectional view of a main portion of a motor according to the eighth embodiment of the present invention.

The motor of the present embodiment is a permanent magnet type synchronous motor. The yoke 135 of the motor has a cylindrical stator yoke portion 163 and a plurality of stator poles 164 which project radially inward from the stator yoke portion 163. A slot 165 is formed between every two adjacent stator poles 164. The stator poles 164 and slots 165 are skewed by an amount corresponding to one slot pitch angle (10°).

An unillustrated rotor is divided into a first rotor portion and a second rotor portion in the axial direction. The first rotor portion is provided with permanent magnets 551 while second rotor portion is provided with permanent magnets 552.

The positional relationship between the permanent magnets 551 and the permanent magnets 552, i.e., the sift angle in the rotational direction is equal to half the slot pitch angle, i.e., 5°. In the present embodiment, the axial length L1 of the permanent magnets 551 is the same as the length L2 of the permanent magnets 552, and the skew angle of the permanent magnets 551 within the axial length L1 is the same as the skew angle of the permanent magnets 552 within the axial length L2.

Accordingly, in the case where the rotor is divided into a plurality of rotor portions and each rotor portion has the same axial length, the sift angle of each rotor portion becomes equal to an angle obtained by dividing the skew angle by the number of the rotor portions.

It is assumed that the space open angle of the first rotor portion is 25° (mechanical angle), the space open angle of the second rotor portion is 15° (mechanical angle), the magnetic pole open angle of each permanent magnet 551 of the first rotor portion is 35° (mechanical angle), the magnetic pole open angle of each permanent magnet 552 of the second rotor portion is 45° (mechanical angle). In this case, the absolute value $d_M$ of the difference between the mechanical angles becomes 10°. Since there are three pairs of magnetic poles, the absolute value $d_E$ of the difference between the electrical angles becomes 30°. In the present embodiment, the absolute value $d_E$ of the difference between the electrical angles is set to an integral multiple of 30°.

With this setting, a phase difference of 180° is produced between a torque ripple generated at the first rotor portion and a torque ripple generated at the second rotor portion when three-phase sinusoidal current is supplied to the stator coils 36. Accordingly, the torque ripples are canceled out so that the overall torque ripple of the motor can be suppressed.

When the rotational angle of the rotor changes from 0° to 5°, the number of stator poles 164 facing each permanent magnet 551 decreases from 4 to 3, whereas the number of stator poles 164 facing each permanent magnet 552 increases from 4 to 5. When the rotational angle of the rotor changes from 5° to 10°, the number of stator poles 164 facing each permanent magnet 551 increases from 3 to 4, whereas the number of stator poles 164 facing each permanent magnet 552 decreases from 5 to 4.

Although the motor used in the present embodiment is a permanent magnet type synchronous motor, the structure of the present embodiment can be applied to a reluctance motor.

Next, a ninth embodiment of the present invention will be described.

In the present embodiment, the stator poles 64 (see FIG. 5) and slots 65 in the first and second embodiments are skewed by an amount corresponding to two slot pitch angle (20°).

Figure 34:
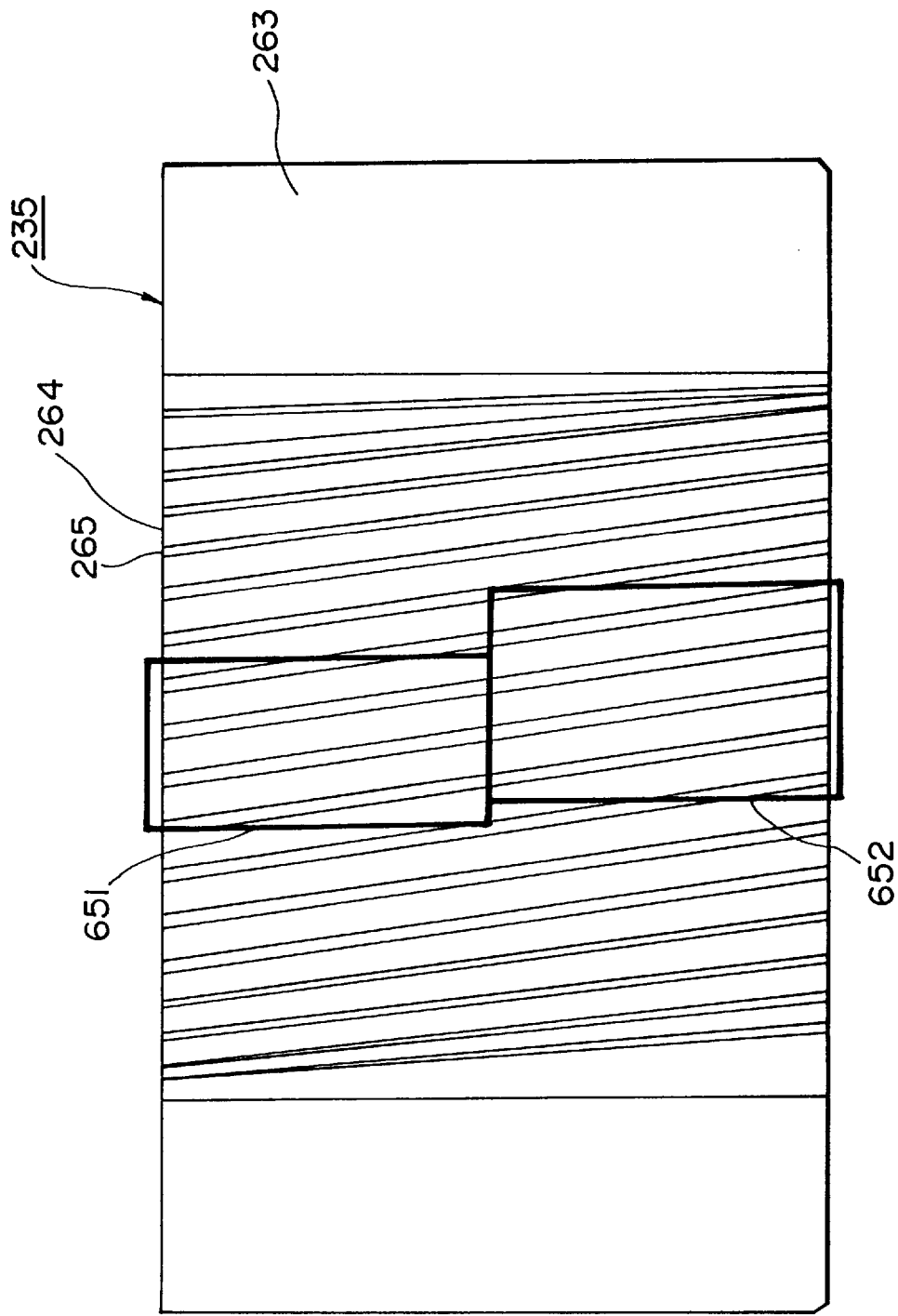
FIG. 34 is a sectional view of a main portion of a motor according to a ninth embodiment of the present invention.

FIG. 34 is a sectional view of a main portion of a motor according to the ninth embodiment of the present invention.

The motor of the present embodiment is a permanent magnet type synchronous motor. The yoke 235 of the motor has a cylindrical stator yoke portion 263 and a plurality of stator poles 264 which project radially inward from the stator yoke portion 263. A slot 265 is formed between every two adjacent stator poles 264. The stator poles 264 and slots 265 are skewed by an amount corresponding to two slot pitch angle (20°).

An unillustrated rotor is divided into a first rotor portion and a second rotor portion in the axial direction. The first rotor portion is provided with permanent magnets 651 while second rotor portion is provided with permanent magnets 652. As is apparent from FIG. 34, the permanent magnets 652 must be sifted with respect to the permanent magnets 651 by a larger amount as the slot pitch angle becomes larger.

It is assumed that the space open angle of the first rotor portion is 25° (mechanical angle), the space open angle of the second rotor portion is 15° (mechanical angle), the magnetic pole open angle of each permanent magnet 651 of the first rotor portion is 35° (mechanical angle), the magnetic pole open angle of each permanent magnet 652 of the second rotor portion is 45° (mechanical angle). In this case, the absolute value $d_M$ of the difference between the mechanical angles becomes 10°. Since there are three pairs of poles, the absolute value $d_E$ of the difference between the electrical angles becomes 30°. In the present embodiment, the abute value $d_E$ of the difference between the electrical angles is set to an integral multiple of 30°.

With this setting, a phase difference of 180° is produced between a torque ripple generated at the first rotor portion and a torque ripple generated at the second rotor portion when three-phase sinusoidal current is supplied to the stator coils 36 (see FIG. 2).

Accordingly, the torque ripples are canceled out so that the overall torque ripple of the motor can be suppressed.

When the rotational angle of the rotor 31 changes from 0° to 5°, the number of stator poles 264 facing each permanent magnet 651 decreases from 4 to 3, whereas the number of stator poles 264 facing each permanent magnet 652 increases from 4 to 5. When the rotational angle of the rotor changes from 5° to 10°, the number of stator poles 264 facing each permanent magnet 651 increases from 3 to 4, whereas the number of stator poles 264 facing each permanent magnet 652 decreases from 5 to 4.

The present invention is not limited to the above-described embodiments, and various modifications and variations can be made based on the spirit of the present invention. Therefore, these modifications and variations should not be construed to be excluded from the scope of the present invention.

What is claimed is:

1. A motor comprising:
    a rotor provided with a plurality of permanent magnets which are arranged at a constant pitch in a circumferential direction of the rotor;
    a stator which surrounds said rotor and is formed with a plurality of stator poles and a slot located between every two stator poles; and
    stator coils which are wound on said stator and are supplied with three-phase sinusoidal current;
    said rotor being formed by a plurality of rotor portions which are arranged in an axial direction of said rotor and which have respective different circumferential widths of the permanent magnets, the difference between one end surface in the circumferential direction of each permanent magnet in one rotor portion and one end surface in the circumferential direction of each corresponding permanent magnet of the same polarity in another rotor portion being $+15° \times n + 360° \times k$ in electrical angle and the difference between the other end surface in the circumferential direction of each permanent magnet in the one rotor portion and the other end surface in the circumferential direction of each corresponding permanent magnet of the same polarity in the another rotor portion being $-15° \times n + 360° \times k$ in electrical angle wherein n is an integer greater than 0 and k is 0 or an integer greater than 0.

2. A motor according to claim 1, wherein the difference between the circumferential width of each permanent magnet in the one rotor portion and the circumferential width of each permanent magnet of the same polarity in the another rotor portion is an odd multiple of a mechanical pitch angle of the slots of said stator.

3. A motor according to claim 1, wherein each of the permanent magnets of each of said rotor portions is a salient pole, and the difference between the circumferential width of each salient pole of the one rotor portion and the circumferential width of each salient pole of the another rotor portion is an integral multiple of 30° in electrical angle.

4. A motor according to claim 3, wherein the numeral n is 1.

5. A motor according to claim 1, wherein the difference between the circumferential width of each salient pole in the one rotor portion and the circumferential width of each salient pole of the same polarity in the another rotor portion being an odd multiple of a mechanical pitch angle of the slots of said stator.

6. A motor according to claim 1, wherein the numeral n is 1.

7. A motor comprising:
    a rotor provided with a plurality of permanent magnets which are arranged at a constant pitch in a circumferential direction of the rotor;
    a stator which surrounds said rotor and is formed with a plurality of stator poles and a slot located between every two stator poles; and
    stator coils which are wound on said stator and are supplied with three-phase sinusoidal current;
    said rotor being formed by a plurality of rotor portions which are arranged in the circumferential direction of said rotor and which have respective different circumferential widths of the permanent magnets, the difference between one end surface in the circumferential direction of each permanent magnet in one rotor portion and one end surface in the circumferential direction of each corresponding permanent magnet of the same polarity in another rotor portion being $-15° \times n + 360° \times k$ in electrical angle and the difference between the other end surface in the circumferential direction of each permanent magnet in the one rotor portion and the other end surface in the circumferential direction of each corresponding permanent magnet of the same polarity in the another rotor portion being $-15° \times n + 360° \times k$ in electrical angle wherein n is an integer greater than 0 and k is 0 or an integer greater than 0.

8. A motor according to claim 7, wherein the difference between the circumferential width of each permanent magnet in the one rotor portion and the circumferential width of each permanent magnet of the same polarity in the another rotor portion is an odd multiple of a mechanical pitch angle of the slots of said stator.

9. A motor according to claim 7, wherein each of the permanent magnets of each of said rotor portions is a salient pole, and the difference between the circumferential width of each salient pole of the one rotor portion and the circumferential width of each salient pole of the another rotor portion is an integral multiple of 30° in electrical angle.

10. A motor according to claim 9, wherein the numeral n is 1.

11. A motor according to claim 7, wherein the numeral n is 1.

12. A motor comprising:

a rotor provided with a plurality of salient poles which are arranged at a constant pitch in a circumferential direction of the rotor;

a stator which surrounds said rotor and is formed with a plurality of stator poles and a slot located between every two stator poles; and stator coils which are wound on said stator and are supplied with three-phase sinusoidal current;

said rotor being formed by a plurality of rotor portions which are arranged in an axial direction of said rotor and which have respective different circumferential widths of the salient poles, the difference of each salient pole in one rotor portion and one end surface in the circumferential direction of each corresponding salient pole of the same polarity in another rotor portion being $$+15° \times n + 360° \times k$$

in the electrical angle and the difference between the other end surface in the circumferential direction of each salient pole in the one rotor portion and the other end surface in the circumferential direction of each corresponding salient pole of the same polarity in the another rotor portion being $$-15° \times n + 360° \times k$$

in electrical angle wherein n is an integer greater than 0 and k is 0 or an integer greater than 0.

13. A motor according to claim 12, wherein the difference between the circumferential width of each salient pole in the one rotor portion and the circumferential width of each salient pole of the same polarity in the another rotor portion is an odd multiple of a mechanical pitch angle of the slots of said stator.

14. A motor according to claim 12, wherein the numeral n is 1.

15. A motor comprising:

a rotor provided with a plurality of salient poles which are arranged at a constant pitch in a circumferential direction of the rotor;

a stator which surrounds said rotor and is formed with a plurality of stator poles and a slot located between every two stator poles; and stator coils which are wound on said stator and are supplied with three-phase sinusoidal current;

said rotor being formed by a plurality of rotor portions which are arranged in the circumferential direction of said rotor and which have respective different circumferential widths of the salient poles, the difference between one end surface in the circumferential direction of each salient pole in one rotor portion and one end surface in the circumferential direction of each corresponding salient pole of the same polarity in another rotor portion being $$+15° \times n + 360° \times k$$

in electrical angle and the difference between the other end surface in the circumferential direction of each salient pole in the one rotor portion and the other end surface in the circumferential direction of each corresponding salient pole of the same polarity in the another rotor portion being $$-15° \times n + 360° \times k$$

in electrical angle wherein n is an integer greater than 0 and k is 0 or an integer greater than 0.

16. A motor according to claim 15, wherein the numeral n is 1.

* * * * *

UNITED STATES PATENT AND TRADEMARK OFFICE
CERTIFICATE OF CORRECTION

PATENT NO. : 5,886,440
DATED : March 23, 1999
INVENTOR(S) : HASEBE et al

It is certified that error appears in the above-identified patent and that said Letters Patent is hereby corrected as shown below:

Col. 5, line 29, "41c" should read --41b--.

Col. 8, line 23, "re" should read --are--.

Col. 21, line 11, "abute" should read --absolute--.

Col. 22, line 43, "-15°" should read --+15°--.

Col. 23, line 16, after "difference" insert --between one end surface in the circumferential direction--.

Signed and Sealed this

Fifteenth Day of August, 2000

Attest:

Q. TODD DICKINSON

Attesting Officer

Director of Patents and Trademarks